US010684695B2

(12) United States Patent
Takeuchi et al.

(10) Patent No.: US 10,684,695 B2
(45) Date of Patent: Jun. 16, 2020

(54) DATA PROCESSING DEVICE, MONITORING SYSTEM, AWAKENING SYSTEM, DATA PROCESSING METHOD, AND DATA PROCESSING PROGRAM

(71) Applicant: OMRON Corporation, Kyoto-shi, Kyoto (JP)

(72) Inventors: Yamato Takeuchi, Kyoto (JP); Koichi Kinoshita, Kyoto (JP); Hitoshi Mukai, Kyoto (JP); Shigenori Nagae, Kyoto (JP); Ayumi Takemoto, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/377,335

(22) Filed: Apr. 8, 2019

(65) Prior Publication Data
US 2019/0339786 A1 Nov. 7, 2019

(30) Foreign Application Priority Data

May 7, 2018 (JP) ................. 2018-089367

(51) Int. Cl.
*G06F 3/01* (2006.01)
*B60K 28/06* (2006.01)
*B60W 50/16* (2020.01)
*B60W 40/08* (2012.01)

(52) U.S. Cl.
CPC ............ *G06F 3/017* (2013.01); *B60K 28/066* (2013.01); *B60W 40/08* (2013.01); *B60W 50/16* (2013.01); *G06F 3/012* (2013.01); *G06F 3/013* (2013.01); *B60W 2040/0827* (2013.01)

(58) Field of Classification Search
CPC ..... B60K 28/066; B60W 40/08; B60W 50/16; G06F 3/012; G06F 3/013
See application file for complete search history.

(56) References Cited

U.S. PATENT DOCUMENTS

| 2007/0132950 | A1* | 6/2007 | Victor | ................... A61B 3/036 351/200 |
| 2007/0217683 | A1 | 9/2007 | Kinoshita | |
| 2008/0130961 | A1 | 6/2008 | Kinoshita | |
| 2011/0152711 | A1* | 6/2011 | Della Santina | ...... A61B 3/0083 600/546 |

(Continued)

FOREIGN PATENT DOCUMENTS

| JP | 2007-249280 A | 9/2007 |
| JP | 5255063 B2 | 8/2013 |
| WO | 2006/051607 A1 | 5/2006 |

*Primary Examiner* — Edward Park
(74) *Attorney, Agent, or Firm* — Metrolex IP Law Group, PLLC

(57) ABSTRACT

A data processing device that performs data processing of monitoring a person, the data processing device includes: a calculator configured to calculate pupil movement and head movement of the person; an evaluator configured to evaluate a suitability degree of a situation in calculating vestibulo-ocular reflex movement based on the pupil movement and the head movement of the person; a provision unit configured to provide the suitability degree evaluated by the evaluator to data relating to the pupil movement and the head movement of the person calculated by the calculator; and a reflex movement calculator configured to calculate the vestibulo-ocular reflex movement of the person based on the data in consideration of the suitability degree.

20 Claims, 7 Drawing Sheets

(56) References Cited

U.S. PATENT DOCUMENTS

| | | | |
|---|---|---|---|
| 2012/0069301 A1* | 3/2012 | Hirata | A61B 3/112 |
| | | | 351/209 |
| 2015/0338915 A1* | 11/2015 | Publicover | H04N 5/44504 |
| | | | 345/633 |
| 2018/0008141 A1* | 1/2018 | Krueger | A61B 5/744 |

* cited by examiner

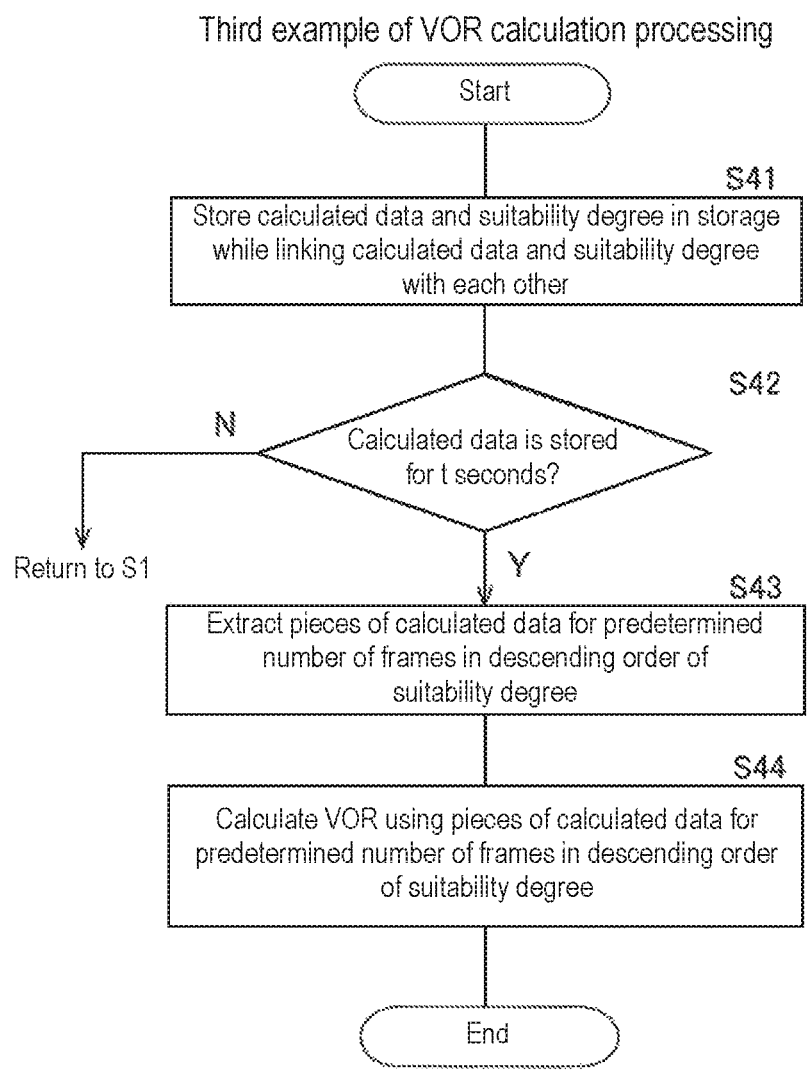

DATA PROCESSING DEVICE, MONITORING SYSTEM, AWAKENING SYSTEM, DATA PROCESSING METHOD, AND DATA PROCESSING PROGRAM

CROSS-REFERENCE TO RELATED APPLICATION

This application is based on Japanese Patent Application No. 2018-089367 filed with the Japan Patent Office on May 7, 2018, the entire contents of which are incorporated herein by reference.

FIELD

The disclosure relates to a data processing device, a monitoring system, an awakening system, a data processing method, and a data processing program.

BACKGROUND

Japanese Patent No. 5255063 discloses a sleepiness sign detection device aiming at detecting a sign before a driver of a vehicle feels sleepiness using vestibulo-ocular reflex induced by a head movement.

The sleepiness sign detection device of Japanese Patent No. 5255063 includes a head movement detection unit for detecting head movement, an eye movement detection unit for detecting eye movement, an ideal eye movement angular velocity calculation unit for calculating ideal eye movement angular velocity based on head movement data detected by the head movement detection unit, an eye rotation angular velocity calculation unit for calculating eye rotation angular velocity based on eye movement data detected by the eye movement detection unit, and a sleepiness sign determination unit for detecting Vestibulo-Ocular Reflex (VOR) from the ideal eye movement angular velocity and the eye rotation angular velocity and determining a sign of sleepiness based on the vestibulo-ocular reflex.

Japanese Patent No. 5255063 discloses a result in which a test is conducted while an experimental task such as fixation of an upper portion of a license plate of the preceding vehicle projected on a screen as a fixation point is imposed on a subject using an experimental system simulating a driving time of a vehicle, namely, a driving simulator system.

However, the pseudo experimental environment using the driving simulator system is greatly different from an actual running environment of the vehicle. The inventor has found that, as a result of verification in the actual running environment of the vehicle (hereinafter, referred to as an actual vehicle environment), a vestibulo-ocular reflex movement is hardly accurately acquired in the actual vehicle environment.

Examples of the eye movements include a saccadic movement (also referred to as an impulsive eye movement) and a congestion movement in addition to the vestibulo-ocular reflex movement. In the experimental environment, the predetermined fixation point is fixated such that the vestibulo-ocular reflex movement is easily generated. However, in the actual vehicle environment, a situation outside the vehicle, a situation of a road surface, a behavior of the vehicle, and the movement of the driver's head and eyes are not constant, and many eye movements other than the vestibulo-ocular reflex movement are generated.

The vestibulo-ocular reflex movement is induced by the head movement. In the experimental environment, the driver's seat is vibrated to induce the head movement. However, in the actual vehicle environment, a vibration state in which the head movement is induced is not necessarily generated. For this reason, it is difficult to accurately determine whether the eye movement is caused by the vestibulo-ocular reflex movement, and it is difficult to accurately detect the vestibulo-ocular reflex movement. Additionally, it is difficult to accurately determine whether the eye movement is the vestibulo-ocular reflex movement in not only the actual vehicle environment but also various real environments such as an operation environment and a working environment of equipment.

SUMMARY

One or more aspects have been made in view of the above problems, and one or more aspects may aim to provide a data processing device, a monitoring system, an awakening system, a data processing method, and a data processing program, which are capable of enhancing calculation accuracy of vestibulo-ocular reflex movement in a real environment.

In order to achieve the above object, there is provided a data processing device (1) according to the present disclosure that performs data processing of monitoring a person, the data processing device including: a calculator configured to calculate pupil movement and head movement of the person; an evaluator configured to evaluate a suitability degree of a situation in calculating vestibulo-ocular reflex movement based on the pupil movement and the head movement of the person; a provision unit configured to provide the suitability degree evaluated by the evaluator to data relating to the pupil movement and the head movement of the person calculated by the calculator; and a reflex movement calculator configured to calculate the vestibulo-ocular reflex movement of the person based on the data in consideration of the suitability degree.

In the data processing device (1), the evaluator evaluates the suitability degree of the situation in calculating the vestibulo-ocular reflex movement, and the provision unit provides the suitability degree to the data. Thus, depending on the suitability degree provided to the data, what kind of suitability is owned by the data as the situation in calculating the vestibulo-ocular reflex movement can be discriminated by the suitability degree provided to the data. The reflex movement calculator calculates the vestibulo-ocular reflex movement of the person based on the data in consideration of the suitability degree. Consequently, even in the real environment where the complicated eye movement and the like are generated, the calculation accuracy of the vestibulo-ocular reflex movement of the person can be enhanced using the proper data in which the suitability degree is considered among the pieces of data.

In the data processing device (1), a data processing device (2) according to the present disclosure further includes a first storage configured to store data in which the suitability degree satisfies a predetermined condition among the pieces of data to which the suitability degree is provided. The reflex movement calculator calculates the vestibulo-ocular reflex movement of the person using the data stored in the first storage.

In the data processing device (2), among the data to which the suitability degree is provided, the data in which the suitability degree satisfies the predetermined condition is stored in the first storage, so that a storage capacity of the first storage can be reduced as compared with the case where all the pieces of data to which the suitability degree is provided are stored. The vestibulo-ocular reflex movement of the person is calculated using the data stored in the first storage. For this reason, as compared with the case of calculating the vestibulo-ocular reflex movement of the person using all the pieces of calculated data to which the suitability degree is provided, a calculation amount can be reduced, and the vestibulo-ocular reflex movement of the person can efficiently be calculated. The use of the data in which the suitability degree satisfies the predetermined condition, namely, the use of the data in which the suitability degree is highly evaluated in the calculation can accurately calculate the vestibulo-ocular reflex movement of the person in the real environment.

In the data processing device (1), a data processing device (3) according to the present disclosure further includes a second storage configured to store the data and the suitability degree. The reflex movement calculator calculates the vestibulo-ocular reflex movement of the person using the data in which the suitability degree satisfies the predetermined condition among the pieces of data stored in the second storage.

In the data processing device (3), the data and the suitability degree are stored in the second storage, and the vestibulo-ocular reflex movement of the person is calculated using the data in which the suitability degree satisfies the predetermined condition among the pieces of data stored in the second storage. For this reason, as compared with the case of calculating the vestibulo-ocular reflex movement of the person using all the pieces of calculated data to which the suitability degree is provided, a calculation amount can be reduced, and the vestibulo-ocular reflex movement of the person can efficiently be calculated. The use of the data in which the suitability degree satisfies the predetermined condition, namely, the use of the data in which the suitability degree is highly evaluated in the calculation can accurately calculate the vestibulo-ocular reflex movement of the person in the real environment.

According to a data processing device (4) of the present disclosure, in the data processing device (3), the data in which the suitability degree satisfies the predetermined condition is data in which the suitability degree is higher than a predetermined threshold or a predetermined number of pieces of data extracted in descending order of the suitability degree.

In the data processing device (4), using the data in which the suitability degree is higher than the predetermined threshold or the predetermined number of pieces of data extracted in descending order of the suitability degree, the calculation amount can be reduced, the vestibulo-ocular reflex movement of the person can efficiently be calculated, and the vestibulo-ocular reflex movement of the person can accurately be calculated in the real environment as compared with the case of calculating the vestibulo-ocular reflex movement of the person using all the pieces of data to which the suitability degree is provided.

In any one of the data processing devices (1) to (4), a data processing device (5) according to the present disclosure further includes a sleepiness detector configured to detect sleepiness based on the vestibulo-ocular reflex movement of the person calculated by the reflex movement calculator.

In the data processing device (5), the sleepiness detector can accurately detect the sign of the sleepiness in the real environment.

In the data processing device (5), a data processing device (6) according to the present disclosure further includes an awakening controller configured to perform control of awakening the person based on the sleepiness detected by the sleepiness detector.

In the data processing device (6), the awakening controller performs the control of awakening the person based on the sleepiness, so that the person can be awakened from the sleepiness.

According to a data processing device (7) of the present disclosure, in any one of the data processing devices (1) to (6), the evaluator evaluates the suitability degree based on a state of the person or an object operated by the person.

In the data processing device (7), the suitability degree is evaluated based on the state of the person or the object operated by the person. For example, the suitability degree is highly evaluated in the case where the state of the person or the object operated by the person is in a proper state as the situation in calculating the vestibulo-ocular reflex movement. In this way, by considering the state of the person or the object operated by the person, the suitability can more accurately be evaluated as the situation in calculating the vestibulo-ocular reflex movement, the suitability degree can more correctly be evaluated, and the calculation accuracy of the vestibulo-ocular reflex movement performed by the reflex movement calculator can further be enhanced.

According to a data processing device (8) of the present disclosure, in the data processing device (7), the object is a vehicle and the person is a driver of the vehicle.

In the data processing device (8), the object is a vehicle, and the person is a driver who drives the vehicle, so that the vestibulo-ocular reflex movement of the driver can efficiently and accurately be calculated in the actual vehicle environment.

According to a data processing device (9) of the present disclosure, in the data processing device (8), the evaluator evaluates the suitability degree based on at least one of a noise component included in the data, a sight line direction of the driver, a running state of the vehicle, and a detection state of the object existing in a traveling direction of the vehicle.

In the data processing device (9), the suitability degree is evaluated based on at least one of the noise component included in the data, the sight line direction of the driver, the running state of the vehicle, and the detection state of the object existing in the traveling direction of the vehicle.

For example, for the small noise component, the suitability degree is highly evaluated. For example, in the case where the sight line direction of the driver falls within a predetermined forward range, in the case where the vehicle runs straight, or in the case where the object is not detected in the traveling direction of the vehicle, the suitability degree is highly evaluated.

Thus, by considering at least one of the noise component included in the data, the sight line direction of the driver, the running state of the vehicle, and the detection state of the object existing in the traveling direction of the vehicle, the suitability degree can more correctly be evaluated in the actual vehicle environment, and calculation accuracy of the vestibulo-ocular reflex movement performed by the reflex movement calculator can further be enhanced. The noise component included in the data includes the eye or head movement components disturbing the calculation of the vestibulo-ocular reflex movement, and, for example, includes the component of the eye movement other than the vestibulo-ocular reflex movement.

In the data processing device (8), a data processing device (10) according to the present disclosure further includes an acquisition unit configured to acquire acceleration of the vehicle. The evaluator evaluates the suitability degree based on a relationship between a change in acceleration of the vehicle acquired from the vehicle and the head movement or the pupil movement of the driver calculated by the calculator.

In the data processing device (10), for example, the suitability degree is highly evaluated in the case where the head movement or the pupil movement of the driver is calculated according to the change in acceleration of the vehicle, namely, following the vibration generated in the vehicle. Thus, the condition that the vestibulo-ocular reflex movement is easily generated is properly evaluated in the actual vehicle environment, the suitability degree can correctly be evaluated, and the calculation accuracy of the vestibulo-ocular reflex movement performed by the reflex movement calculator can further be enhanced.

A monitoring system (1) according to the present disclosure includes: any one of the data processing devices (1) to (10); and an imaging device configured to capture an image including the person. The calculator of the data processing device calculates the pupil movement and the head movement of the person using the image acquired from the imaging device.

Because the monitoring system (1) includes any one of the data processing devices (1) to (10) and the imaging device, a system that is easily introduced in various real environments can be obtained, one of the effects of the data processing devices (1) to (10) being obtained in the system.

An awakening system according to the present disclosure includes: the data processing device (6); and an awakening device controlled by the awakening controller of the data processing device (6). In the awakening system, the awakening controller controls the awakening device, so that the awakening device can properly awaken the person.

A data processing method according to the present disclosure is a data processing method for monitoring a person, the method including: a calculation step of calculating pupil movement and head movement of the person; an evaluation step of evaluating a suitability degree of a situation in calculating vestibulo-ocular reflex movement based on the pupil movement and the head movement of the person; a provision step of providing the suitability degree evaluated in the evaluation step to data relating to the pupil movement and the head movement of the person calculated in the calculation step; and a reflex movement calculation step of calculating the vestibulo-ocular reflex movement of the person based on the data in consideration of the suitability degree.

In the data processing method, the suitability degree of the situation in calculating the vestibulo-ocular reflex movement is evaluated in the evaluation step, and the suitability degree is provided to the data in the provision step. Thus, depending on the suitability degree provided to the data, what kind of suitability is owned by the data as the situation in calculating the vestibulo-ocular reflex movement can be discriminated by the suitability degree provided to the data. The vestibulo-ocular reflex movement of the person is calculated in the reflex movement calculation step based on the data in consideration of the suitability degree. Consequently, even in the real environment where the complicated eye movement and the like are generated, the calculation accuracy of the vestibulo-ocular reflex movement of the person can be enhanced using the proper data in which the suitability degree is considered among the pieces of data.

A data processing program according to the present disclosure is a data processing program causing at least one computer to perform data processing of monitoring a person, the data processing program causing the at least one computer to perform: a calculation step of calculating pupil movement and head movement of the person; an evaluation step of evaluating a suitability degree of a situation in calculating vestibulo-ocular reflex movement based on the pupil movement and the head movement of the person; a provision step of providing the suitability degree evaluated in the evaluation step to data relating to the pupil movement and the head movement of the person calculated in the calculation step; and a reflex movement calculation step of calculating the vestibulo-ocular reflex movement of the person based on the data in consideration of the suitability degree.

In the data processing program, the suitability degree of the situation in calculating the vestibulo-ocular reflex movement is evaluated in the evaluation step, and the suitability degree is provided to the data in the provision step. Thus, depending on the suitability degree provided to the data, what kind of suitability is owned by the data as the situation in calculating the vestibulo-ocular reflex movement can be discriminated by the suitability degree provided to the data. The vestibulo-ocular reflex movement of the person is calculated in the reflex movement calculation step based on the data in consideration of the suitability degree. Consequently, the data processing device can be constructed in which the calculation accuracy of the vestibulo-ocular reflex movement of the person can be enhanced using the proper data in which the suitability degree is considered among the pieces of data even in the actual vehicle environment where the complicated eye movement and the like are generated.

BRIEF DESCRIPTION OF THE DRAWINGS

FIG. 7 is a flow diagram illustrating a third example of a VOR calculation processing operation performed by a control unit in a data processing device of one or more embodiments.

DETAILED DESCRIPTION

Embodiments of a data processing device, a monitoring system, an awakening system, a data processing method, and a data processing program will be described below with reference to the drawings. For example, the data processing device according to one or more embodiments is widely applicable to a system that monitors a person (subject). For example, in addition to a system that monitors drivers (operators) of various moving bodies such as vehicles, railroad vehicles, airplanes, and ships, the data processing device can also be applied to a system that monitors a person who operates and monitors various types of equipment such as machines and devices in the factory and performs predetermined work.

System Configuration Example

Figure 1:
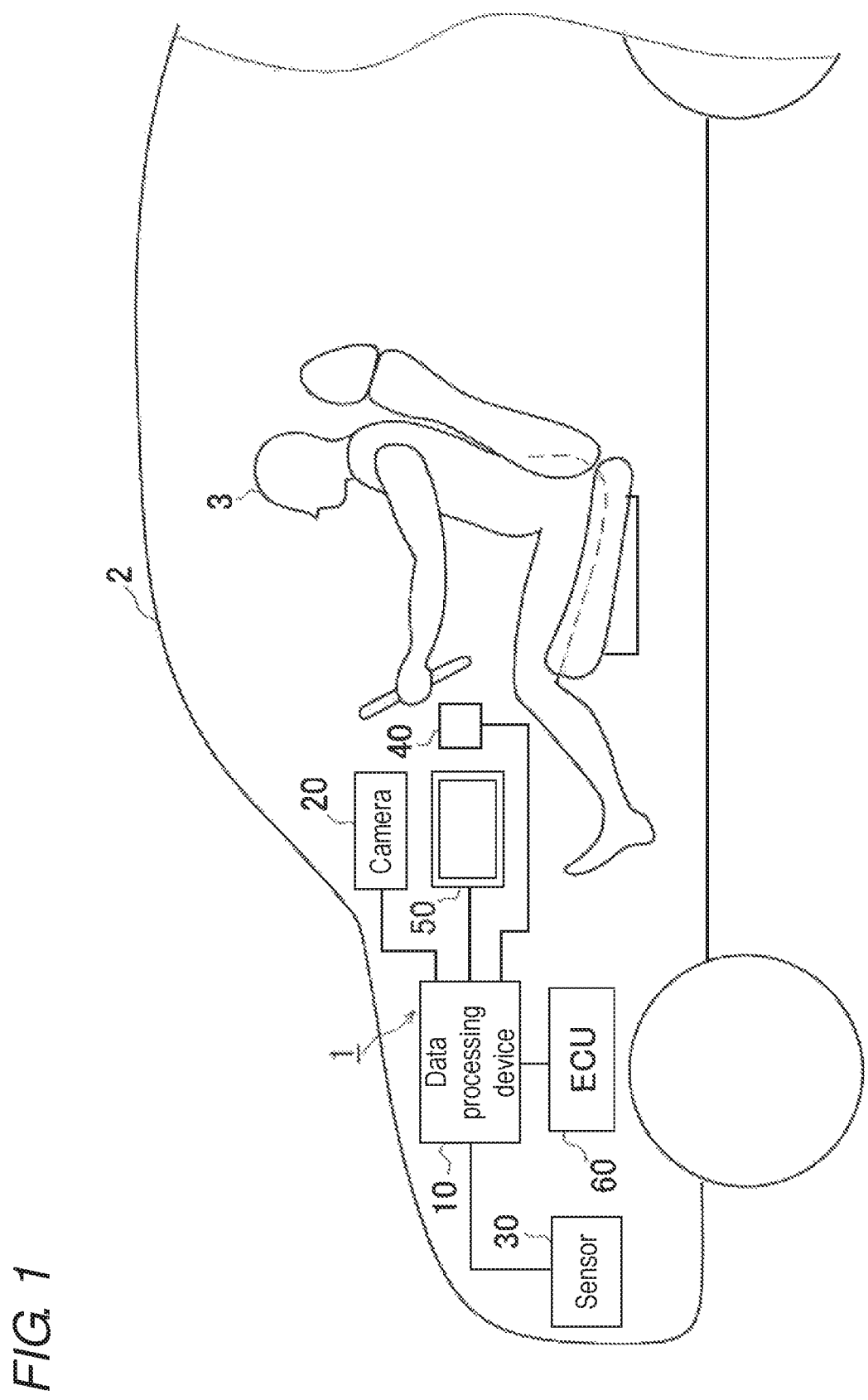
FIG. 1 is a diagram schematically illustrating an example of a monitoring system using a data processing device according to one or more embodiments.

FIG. 1 is a view schematically illustrating an example of a monitoring system using a data processing device according to one or more embodiments.

A monitoring system 1 is a driver monitoring system mounted on a vehicle 2, and includes a data processing device 10 and a camera 20. The data processing device 10 is a computer that performs data processing in order to monitor a driver 3 of the vehicle 2. The camera 20 is an example of the "imaging device" of one or more embodiments. The camera 20 is connected to the data processing device 10, and arranged so as to be able to capture an image including a face of the driver 3.

The vehicle 2 is an automobile. However, the vehicle 2 may be a vehicle such as a two-wheeled vehicle, and a type of the vehicle 2 is not particularly limited. The vehicle 2 may be a vehicle (a so-called manual driving vehicle) with a level 0 (no driving automation) at an automatic driving level presented by the American Automotive Engineers Association (SAE) or an automatic driving vehicle. The automatic driving vehicle may be equipped with one of a level 1 (driver assistance), a level 2 (partial automatic driving), a level 3 (conditional automatic driving), a level 4 (advanced automatic driving), and a level 5 (fully automatic driving) in the automatic driving level presented by the SAE.

The data processing device 10 is configured to be connectable to various devices, such as an in-vehicle sensor 30, a starting switch 40, and a navigation device 50, which are mounted on the vehicle 2. The data processing device 10 may be configured to be connectable to at least one Electronic Control Unit (ECU) 60 that controls each unit such as a driving unit, a braking unit, a steering unit, and a suspension unit of the vehicle 2. For example, the starting switch 40 is an ignition switch.

The data processing device 10 aims to enhance calculation accuracy of vestibulo-ocular reflex movement of the driver 3 in the actual vehicle environment as an example of the real environment. The vestibulo-ocular reflex movement (hereinafter also referred to as "VOR") is eye movement induced by head movement of a person, and is involuntary eye movement that suppresses blurring of a retinal image by moving the eye in a direction opposite to the head movement.

As described in the section of the background, in the actual vehicle environment, the situation outside the vehicle, the situation of the road surface, the behavior of the vehicle, the movement of the driver's head and eyes, and the like are not constant. For this reason, data of the pupil movement and the head movement of the driver includes many components (also referred to as noise components) of movement, such as a saccadic movement and a congestion movement, which are different from the vestibulo-ocular reflex movement. As a result, a Signal-Noise (SN) ratio of the data used to detect the vestibulo-ocular reflex movement tends to be degraded, and the vestibulo-ocular reflex movement of the driver is hardly detected with high accuracy. A signal of Signal-Noise (SN) indicates the eye movement indicating the vestibulo-ocular reflex movement, and the noise indicates the eye movement (such as the saccadic movement and the congestion movement) other than the vestibulo-ocular reflex movement.

In order to solve this problem, the data processing device 10 of one or more embodiments adopts the following configuration. The data processing device 10 acquires a captured image from the camera 20, and calculates at least the pupil movement and the head movement of the driver 3 from the acquired captured image. Based on the pupil movement and head movement of the driver 3, the data processing device 10 detects a suitability degree of the situation when calculating the vestibulo-ocular reflex movement.

The suitability degree is evaluated based on at least one of a state of the driver 3 detected from the captured image or a state of the vehicle 2 detected by the in-vehicle sensor 30. The state of the driver 3 includes a sight line direction of the driver 3. For example, the state in which the driver 3 gazes at a specific direction or a specific point is the state in which the eye movement (such as the saccadic movement and the congestion movement) other than the vestibulo-ocular reflex movement is hardly generated, namely, the noise component of the vestibulo-ocular reflex movement becomes small and the S/N ratio easily increases. When the driver 3 is in this state, for example, the state of the driver 3 is determined to be suitable or highly suitable, and the suitability degree is highly evaluated.

The state of the vehicle 2 includes a running state of the vehicle 2, a detection state of an object (such as a person and another vehicle) existing in a traveling direction of the vehicle 2, and the like. The suitability degree may be evaluated based on a relationship between a change in acceleration of the vehicle 2 and the pupil movement or the head movement of the driver 3. For example, in the case where the state of the vehicle 2 is the state in which the head of the driver 3 is easily displaced or vibrated in an up-down, right-left, front-back, yaw, or pitch direction, namely, in the case where the signal component of the vestibulo-ocular reflex movement, particularly a displacement amount tends to be increased, for example, the state of the vehicle 2 is determined to be suitable or highly suitable, and the suitability degree is highly evaluated.

In the case where the state of the vehicle 2 is the running state in which the eye movement (such as the saccadic movement and the congestion movement) other than the vestibulo-ocular reflex movement of the driver 3 is hardly generated, namely, in the case where the noise component of the vestibulo-ocular reflex movement is decreased, specifically, in the case where the vehicle 2 runs on a straight road, for example, the state of the vehicle 2 is determined to be suitable or highly suitable, and the suitability degree is highly evaluated.

The suitability degree evaluated as described above is represented as data that can be recognized by a computer. For example, the suitability degree may be represented by binary data indicating presence or absence of the suitability for calculating the VOR or a level of the suitability, or multi-valued data (for example, ranked or weighted) according to an extent of suitability. For example, the extent of suitability indicates a rate of suitability as the state of calculating the VOR.

The data processing device 10 provides the suitability degree to data relating to the pupil movement and the head movement of the driver 3, the data being calculated based on the captured image. The data relating to the pupil movement and the head movement of the driver 3 to which the suitability degree is provided may be the data of the pupil movement and the head movement of the driver 3, a value calculated from the data of the pupil movement and the head movement of the driver 3, or a value indicating relevance between the pupil movement and the head movement of the driver 3. For example, the data processing device 10 may provide the suitability degree to a value such as a coefficient indicating a correlation between the pupil movement and the head movement.

In consideration of the suitability degree provided to the data (hereinafter, also referred to as calculated data) relating to the pupil movement and the head movement of the driver 3, the data processing device 10 calculates the vestibulo-ocular reflex movement of the driver 3 based on the calculated data. For example, the vestibulo-ocular reflex movement of the driver 3 is calculated using the data in which the suitability degree satisfies a predetermined condition among the pieces of data relating to the pupil movement and the head movement of the driver 3. For example, the data in which the suitability degree satisfies the predetermined condition includes the data in which the suitability degree is highly evaluated, more specifically, the data that is evaluated to be suitable or highly suitable as the state of calculating the VOR. In the case where the suitability degree is represented by multi-valued data indicating the rate of suitability, data in which the suitability degree is greater than or equal to a predetermined threshold can be cited as an example of the data in which the suitability degree satisfies the predetermined condition.

In the data processing device 10, using the data in which the suitability degree satisfies the predetermined condition among the pieces of data relating to the pupil movement and the head movement of the driver 3, the vestibulo-ocular reflex movement of the driver 3 can efficiently and accurately be calculated in the actual vehicle environment in which the complicated eye movements and the like are generated.

Hardware Configuration Example

Figure 2:
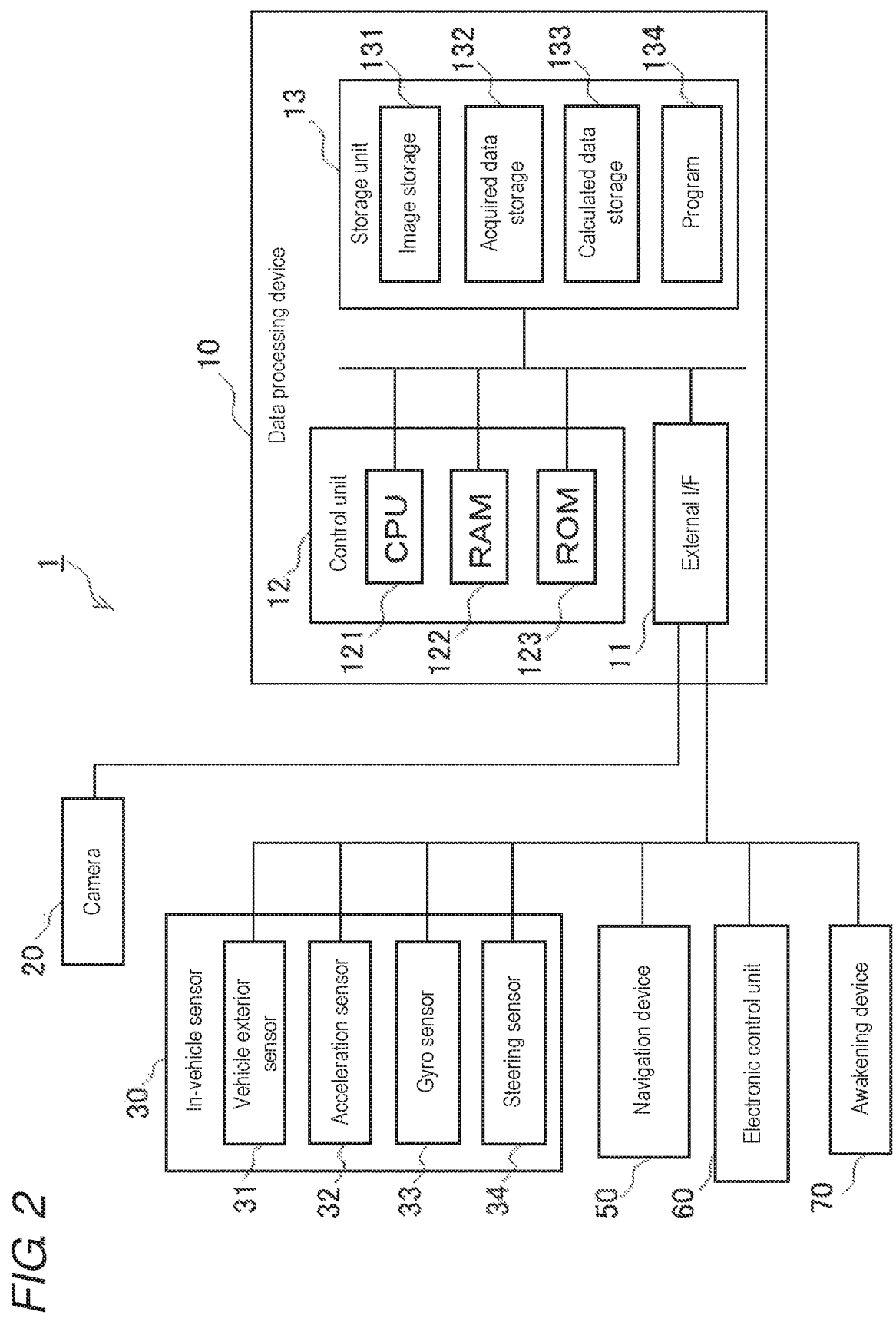
FIG. 2 is a block diagram illustrating an example of a hardware configuration of a monitoring system of one or more embodiments.

FIG. 2 is a block diagram illustrating a hardware configuration example of the monitoring system 1 of one or more embodiments. The monitoring system 1 includes the data processing device 10 and the camera 20.

The data processing device 10 is constructed with a computer to which an external interface (also referred to as an external I/F) 11, a control unit 12, and a storage unit 13 are electrically connected. The control unit 12 includes a Central Processing Unit (CPU) 121 that is a hardware processor, a Random Access Memory (RAM) 122, and a Read Only Memory (ROM) 123, and performs various kinds of control according to data processing. The control unit 12 may include a plurality of hardware processors. In addition to the CPU 121, the hardware processor may include a microprocessor, and a Graphics Processing Unit (GPU).

The storage unit 13 is constructed with at least one storage device, such as the RAM, the ROM, a hard disk drive (HDD), a solid state drive (SSD), a flash memory, and other volatile or nonvolatile memories, which can store data by a semiconductor device.

The storage unit 13 includes an image storage 131, an acquired data storage 132, and a calculated data storage 133. The calculated data storage 133 is an example of the "first storage" and the "second storage" in one or more embodiments. A program 134 is stored in the storage unit 13. The program 134 is a program including an instruction to cause the data processing device 10 to execute various pieces of data processing of monitoring the driver 3. The program 134 may be stored in the ROM 123 of the control unit 12. Each unit of the storage unit 13 may be provided in the RAM 122 of the control unit 12.

The external I/F 11 is an interface that connects the data processing device 10 to various devices mounted on the vehicle 2, and is configured appropriately according to the connected device. For example, the external I/F 11 is connected to the camera 20, the in-vehicle sensor 30, the starting switch 40, the navigation device 50, the electronic control unit 60, and the awakening device 70 through an in-vehicle network such as a Controller Area Network (CAN). The external I/F 11 may be provided in each connected device. A device other than the above devices may be connected to the external I/F 11.

The camera 20 is a device that captures an image including a face of the driver 3. For example, the camera 20 includes a lens unit (not illustrated), an imaging element unit (not illustrated), a light irradiation unit (not illustrated), a controller (not illustrated) that controls these components. For example, the imaging element unit includes an imaging element such as a Charge Coupled Device (CCD) and a Complementary Metal Oxide Semiconductor (CMOS), a filter, and a microlens.

The imaging element unit may include an infrared sensor, such as the CCD, the CMOS, or a photodiode, which can form the captured image by receiving an ultraviolet ray or an infrared ray, in addition to the imaging element capable of receiving light in a visible region to form the captured image.

The light irradiation unit includes a light emitting element such as a Light Emitting Diode (LED), and an infrared LED or the like may be used as the light irradiation unit such that the state of the driver can be captured irrespective of day and night. The controller includes a CPU, a memory, and an image processing circuit.

The controller controls the imaging element unit and the light irradiation unit to output the light (for example, a near infrared ray) from the light irradiation unit, and performs control such that the imaging element unit captures the image using reflected light. The camera 20 captures the image at a predetermined frame rate (for example, 30 to 60 frames per second), and the image data captured by the camera 20 is output to the data processing device 10 and stored in the image storage 131.

Although the camera 20 is constructed with one camera, the camera 20 may be constructed with at least two cameras. The camera 20 may be configured separately from the data processing device 10 (separate casing), or may be integrated with the data processing device 10 (identical casing). The camera 20 may be a monocular camera or a stereo camera.

An installation position of the camera 20 in a passenger compartment is not particularly limited as long as the installation position is a position at which the image of a visual field including at least the face of the driver 3 can be captured. For example, in addition to a vicinity of a center of a dashboard of the vehicle 2, the camera 20 may be installed in a steering portion, a steering column portion, a meter panel portion, a position in the vicinity of a room mirror, an A pillar portion, and the navigation device 50. Information including a specification of the camera 20 (such as an angle of view and a number of pixels (length by width)) and a position posture (such as a mounting angle and a distance from a predetermined origin (such as a handle center position)) may be stored in the camera 20 or the data processing device 10.

The in-vehicle sensor 30 includes a vehicle exterior sensor 31, an acceleration sensor 32, a gyro sensor 33, and a steering sensor 34.

Alternatively, the in-vehicle sensor 30 may include other sensors.

The vehicle exterior sensor 31 is a sensor that detects the object existing around the vehicle 2. In addition to a moving object such as another vehicle, a bicycle, and a person, the object may include structures that affect the running of the vehicle 2 including road markings such as white lines, a guardrail, and a median strip. The vehicle exterior sensor 31 is configured to include at least one of a front monitoring camera, a rear monitoring camera, a radar, a Light Detection and Ranging or Laser Imaging Detection and Ranging (LIDAR), and an ultrasonic sensor. Detection data of the object detected by the vehicle exterior sensor 31 may be output to the electronic control unit 60 in addition to being output to the data processing device 10. A stereo camera or a monocular camera can be used as the front monitoring camera and the rear monitoring camera. The radar transmits a radio wave such as a millimeter wave to the surroundings of the vehicle, and detects the position, direction, and distance of the object by receiving the radio wave reflected from the object existing around the vehicle. The LIDAR transmits laser light to the surroundings of the vehicle, and detects the position, direction, and distance of the object by receiving the light reflected from the object existing around the vehicle.

The acceleration sensor 32 is a sensor that detects the acceleration of the vehicle 2. A three-axis acceleration sensor that detects the acceleration in three directions of X, Y, and Z axes, a biaxial acceleration sensor, and a single axis acceleration sensor may be used as the acceleration sensor 32. In addition to the capacitance type, a semiconductor type acceleration sensor such as a piezoresistive type may be used as the three-axis acceleration sensor. Acceleration data detected by the acceleration sensor 32 may be output to the navigation device 50 or the electronic control unit 60 in addition to being output to the data processing device 10.

The gyro sensor 33 is an angular velocity sensor that detects a rotation angular velocity (for example, a yaw rate) of the vehicle 2. A signal of the rotation angular velocity detected by the gyro sensor 33 may be output to the navigation device 50 or the electronic control unit 60 in addition to being output to the data processing device 10.

The steering sensor 34 is a sensor that detects a steering amount with respect to the steering wheel of the vehicle 2. For example, the steering sensor 34 is provided on a steering shaft of the vehicle 2, and detects a steering torque given to the steering wheel by the driver 3 or a steering angle of the steering wheel. A signal, which corresponds to steering operation of the driver 3 and is detected by the steering sensor 34, may be output to the electronic control unit 60 in addition to being output to the data processing device 10.

The navigation device 50 includes a controller (not illustrated), a display (not illustrated), an audio output unit (not illustrated), an operation unit (not illustrated), a map data storage (not illustrated), and a GPS receiver (not illustrated). For example, based on positional information about the vehicle 2 measured by the GPS receiver and map information of the map data storage, the navigation device 50 identifies the road and the lane on which the vehicle 2 runs, calculates a route from a current position of the vehicle 2 to a destination, displays the route on the display, and outputs sound such as route guidance from the sound output unit. The positional information about the vehicle 2, the information about the running road, and the information about the planned running route, which are obtained by the navigation device 50, are outputted to the data processing device 10.

The electronic control unit 60 is constructed with at least one computer device that controls each unit of the vehicle 2, such as the driving unit, the braking unit, the steering unit, and the suspension unit of the vehicle 2. The data processing device 10 stores the data acquired from the in-vehicle sensor 30, the navigation device 50, and the electronic control unit 60 in the acquired data storage 132.

The awakening device 70 is a device controlled by the data processing device 10, and performs operation to awaken the driver 3 based on a control signal from the data processing device 10. For example, the awakening device 70 may be constructed with an alarm device that issues an alarm to the driver 3 by sound or light. Alternatively, the awakening device 70 may be constructed with an air conditioner that blows cold air, warm air, or gas containing an aroma component or an odor component to the driver 3. Alternatively, the awakening device 70 may be constructed with a vibrating device that vibrates a steering wheel, a seat belt, a seat, or the like.

Functional Configuration Example

Figure 3:
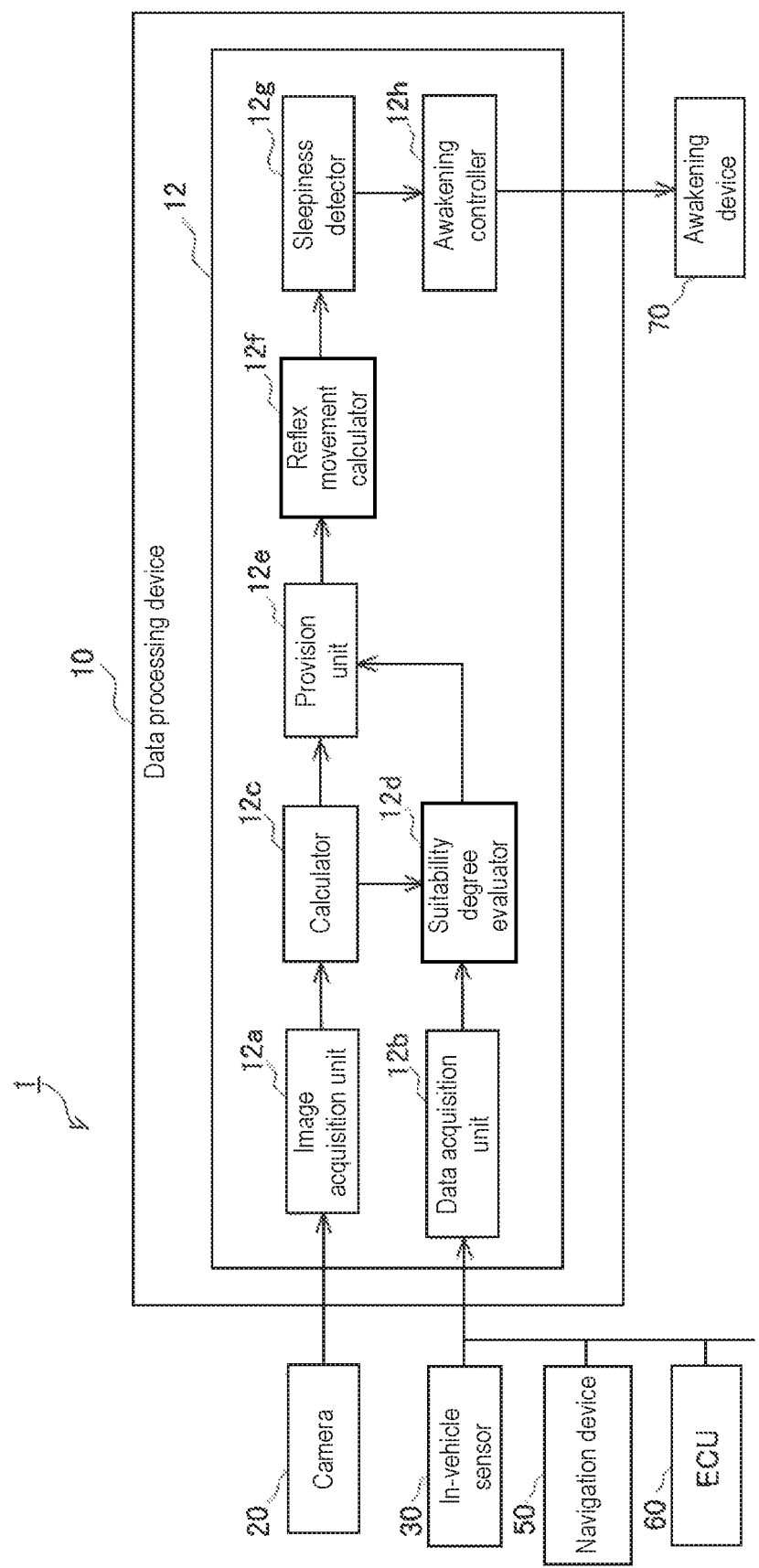
FIG. 3 is a block diagram illustrating an example of a functional configuration of a data processing device of one or more embodiments.

FIG. 3 is a block diagram illustrating an example of a functional configuration of the control unit 12 in the data processing device 10 of one or more embodiments.

The control unit 12 of the data processing device 10 develops the program 134 stored in the storage unit 13 of FIG. 2 in the RAM 122. The control unit 12 interprets and executes the program 134 developed in the RAM 122 using the CPU 121, thereby controlling each component. Consequently, the data processing device 10 is constructed as the computer in which the control unit 12 includes an image acquisition unit 12*a*, a data acquisition unit 12*b*, a calculator 12*c*, a suitability degree evaluator 12*d*, a provision unit 12*e*, a reflex movement calculator 12*f*, a sleepiness detector 12*g*, and an awakening controller 12*h* in FIG. 3. These units provided in the control unit 12 may be configured as software modules.

The image acquisition unit 12*a* acquires the captured image from the camera 20. The data of the captured image acquired by the image acquisition unit 12*a* is output to the calculator 12*c*. The data of the captured image acquired by the image acquisition unit 12*a* may be stored in the image storage 131, and output from the image storage 131 to the calculator 12*c*.

The data acquisition unit 12*b* acquires the data indicating the state of the vehicle 2 from the in-vehicle sensor 30, the starting switch 40, the navigation device 50, the electronic control unit 60, and the like. The data, which indicates the state of the vehicle 2 and is acquired by the data acquisition unit 12*b*, is output to the suitability degree evaluator 12*d*. The data, which indicates the state of the vehicle 2 and is acquired by the data acquisition unit 12*b*, may be stored in the acquired data storage 132, and output from the acquired data storage 132 to the suitability degree evaluator 12*d*.

The calculator 12*c* performs processing of calculating the pupil movement and the head movement of the driver 3. In one or more embodiments, the pupil movement and the head movement of the driver 3 are calculated by image analysis of the captured image acquired from the camera 20. For example, the calculation processing is performed in each frame of the captured image. Alternatively, the calculation processing may be performed at predetermined frame intervals.

An example of the pupil movement calculation processing performed by the calculator 12c will be described below. The calculator 12c detects the face (for example, a face region) of the driver 3 from the image captured by the camera 20 by template matching. The face region may be detected using a template image of a previously-prepared face. Subsequently, the calculator 12c detects the position of the pupil from the face region of the driver 3 by performing the template matching on the face region of the driver 3 detected from the captured image. The position of the pupil may be detected using the previously-prepared template image of the pupil. The calculator 12c detects the position of the pupil of the driver 3 in each frame of the captured image, and calculates the pupil movement (for example, eye movement angular velocity) from the position change (movement amount) of the pupil for each frame.

An example of the head movement calculation processing performed by the calculator 12c will be described below. The calculator 12c detects the face (for example, a face region) of the driver 3 from the image captured by the camera 20 by the template matching. The face region may be detected using a template image of a previously-prepared face. The data of the face region of the driver 3 detected by the above processing of calculating the pupil movement may be used.

Subsequently, the calculator 12c detects the position of the eye from the face region by performing the template matching on the face region of the driver 3 detected from the captured image. The position of the eye may be detected using the previously-prepared template image of the eye. In the template image of the eye, for example, coordinates indicating the positions of the outer corner of the eye and the inner corner of the eye are previously linked to each other. The positions of the outer and inner corners of the eye of the driver 3 in the captured image can be detected from the coordinates of the outer and inner corners of the eye in the template image of the eye. Because the positions of the outer and inner corners of the eye do not move due to opening and closing movement of the eye such as blinking, the position changes of the outer and inner corners of the eye are assumed to be moved by the head movement. The calculator 12c detects the positions of the outer and inner corners of the driver 3 in each frame of the captured image, and calculates the head movement (for example, head movement angular velocity) from the position changes (movement amount) of the outer and inner corners of the eye for each frame. The position of the outer corner of the eye or the inner corner of the eye may be detected.

In addition to the use of two-dimensional image data, the positions of the outer and inner corners of the eye of the driver 3 may be detected from the captured image in combination with distance image data including three-dimensional positional information. In order to acquire the distance image data, for example, the monitoring system 1 may be equipped with a three-dimensional image measuring unit. The three-dimensional image measuring unit is configured to acquire a three-dimensional image (distance image) in which each pixel of the captured image has a value (information about a depth) of the distance to the object. For example, the three-dimensional image measuring unit may be a passive type measuring unit such as a stereo method or an active type measuring unit of a system that projects light such as optical radar or pattern light.

Whether the position changes of the outer and inner corners of the eye of the driver 3 are caused by parallel movement (up-down or right-left movement) or rotation movement (movement in the yaw or pitch direction) of the head can accurately be detected by combining the two-dimensional image and the distance image in this way. With this configuration, the pupil movement and the head movement can more accurately be calculated, and the monitoring accuracy of the vestibulo-ocular reflex movement can further be enhanced.

The processing of calculating the pupil movement and the head movement of the driver 3 is not limited to the above example, but various known techniques can be adopted. For example, as disclosed in International Publication No. 2006/051607 and Japanese Unexamined Patent Publication No. 2007-249280, a feature point of each organ (such as eyes, a mouth, a nose, and ears) of a face is detected in each frame of the image, a direction of the face is obtained from the position of the feature point of each organ of the face, and the head movement may be calculated from the change (movement amount) of the direction of the face in each frame.

In addition to calculation of the pupil movement and the head movement of the driver 3, the calculator 12c may calculate information about the direction of the sight line and the opening and closing of the eyes. The pupil movement of the driver 3 is calculated by the image analysis of the captured image acquired from the camera 20, and the head movement of the driver 3 may be calculated based on the data acquired from a gyro sensor or the like attached to the head of the driver 3. The data (calculated data), which relates to the pupil movement and the head movement of the driver 3 and is calculated by the calculator 12c, is output to the provision unit 12e and the suitability degree evaluator 12d.

The suitability degree evaluator 12d takes in the data, which indicates the state of the vehicle 2 and is acquired by the data acquisition unit 12b, and the data, which indicates the state of the driver 3 and is calculated by the calculator 12c, and performs the processing of evaluating the suitability degree of the situation using these pieces of data when the vestibulo-ocular reflex movement of the driver 3 is calculated. For example, the suitability degree evaluator 12d evaluates the suitability degree by determining whether the state of the driver 3 or the state of the vehicle 2 is in a predetermined state suitable for the calculation of the vestibulo-ocular reflex movement.

The above predetermined state includes the state in which the head of the driver 3 is easily vibrated, namely, the state in which a signal component of the vestibulo-ocular reflex movement, particularly the displacement amount increases. More specifically, the predetermined state includes the state in which the head of the driver 3 is easily displaced or vibrated in the up-down direction, the right-left direction, the front-rear direction, or in the yaw or pitch direction.

The predetermined state also includes the state in which the eye movement (for example, the saccadic movement or the congestion movement) other than the vestibulo-ocular reflex movement is hardly generated, namely, the state in which the noise component of the vestibulo-ocular reflex movement becomes small. More specifically, the predetermined state includes the state in which the vehicle 2 runs on a straight road, or the state in which the driver 3 gazes at a specific point.

An example of the processing performed by the suitability degree evaluator 12d will be described below. (1) The suitability degree evaluator 12d determines whether the pupil movement and the head movement of the driver 3 can be calculated by the calculator 12c. Unless the pupil movement and the head movement are properly calculated, the vestibulo-ocular reflex movement cannot be calculated.

In the case where the calculated data is acquired from the calculator 12c, the suitability degree evaluator 12d determines a similarity between the face region extracted from the image by the template matching and the template image of the face or a similarity between the eye region extracted from the image and the template image of the eye. In the case where each similarity is lower than a predetermined threshold, it may be evaluated that the position of the head (the eye, namely, the outer and inner corners of the eye) or the position of the pupil cannot properly be acquired from the image, namely, the calculated data may be evaluated to be unsuitable as the state of calculating the vestibulo-ocular reflex movement (for example, the similarity has no suitability or the suitability is low).

(2) The suitability degree evaluator 12d may determine whether the data of the pupil movement is the data including many noise components such as the eye movement other than the vestibulo-ocular reflex movement, namely, the saccadic movement. For example, in the case where the eye movement such as the rotation speed or the rotation angle of the eye is larger than a predetermined threshold, such as the case where momentum of the pupil is larger than momentum of the head, or in the case where the pupil moves or rotates by following the movement or the rotation direction of the head (that is, in the substantially identical direction), the data of the pupil movement includes many noise components such as the saccadic movement. In such a case, the data of the pupil movement may be evaluated to be unsuitable as the state of calculating the vestibulo-ocular reflex movement.

When the direction of the face moves greatly, because the driver 3 is not in the state of concentrating on a certain direction, the data of the head movement includes many noise components in the case where the head movement such as the rotation speed and the rotation angle of the face is larger than a predetermined threshold. In such a case, the data of the pupil movement may be evaluated to be unsuitable as the state of calculating the vestibulo-ocular reflex movement.

(3) The suitability degree evaluator 12d may acquire the vehicle speed data through the data acquisition unit 12b in accordance with an acquisition cycle of the captured image taken in the calculator 12c, and determine whether the vehicle speed data is smaller than a predetermined speed or whether the vehicle speed data is larger than the predetermined speed. By this determination, whether the data calculated by the calculator 12c is the data suitable for the calculation of the vestibulo-ocular reflex movement, namely, the suitability degree of the situation in calculating the vestibulo-ocular reflex movement (for example, the presence or absence of the suitability, the suitability degree according to the binary determination such as the level of the suitability, or the suitability degree by the multilevel determination such as the rate of suitability) can be evaluated.

In the case where the vehicle speed is high, generally, the driver 3 tends to concentrate on a narrow forward range. On the other hand, in the case where the vehicle speed is low, the driver 3 tends to voluntarily look over a wide range in order to ensure surrounding safety. Preferably, the data of the eye movement and the head movement in the state in which the driver 3 concentrates on observing the narrow range is used in the case where the vestibulo-ocular reflex movement is calculated. The suitability degree evaluator 12d may evaluate that the vehicle speed data is not suitable as the state of calculating the vestibulo-ocular reflex movement in the case where the vehicle speed data is smaller than a predetermined speed (for example, a slow speed), and evaluate that the vehicle speed data is suitable as the state of calculating the vestibulo-ocular reflex movement when the vehicle speed data is larger than the predetermined speed.

The suitability degree evaluator 12d does not perform the binary determination of the suitability with the predetermined speed as the threshold, but may use a weight coefficient weighted according to the vehicle speed as the suitability degree. For example, the weight coefficient is set to 0.2 when the vehicle speed ranges from 0 km/h to 20 km/h during the calculation of the pupil movement and the head movement using the calculator 12c, the weight coefficient is set to 0.5 when the vehicle speed ranges from 20 km/h to 40 km/h, and the weight coefficient is set to 0.8 when the vehicle speed ranges from 40 km/h to 60 km/h, the weight coefficient is set to 1.0 when the vehicle speed is greater than or equal to 60 km/h, and these weight coefficients may be used as the suitability degree.

(4) The suitability degree evaluator 12d may acquire the steering data through the data acquisition unit 12b in accordance with the acquisition cycle of the captured image taken in the calculator 12c, and determine whether the steering data is larger than a predetermined steering angle. By this determination, whether the data calculated by the calculator 12c is the data suitable for the calculation of the vestibulo-ocular reflex movement, namely, the suitability degree of the situation in calculating the vestibulo-ocular reflex movement (for example, the presence or absence of the suitability, the suitability degree according to the binary determination such as the level of the suitability, or the suitability degree by the multilevel determination such as the rate of suitability) can be evaluated.

Preferably, the data of the eye movement and the head movement in the state in which the driver 3 concentrates on observing the front narrow range is used in the case where the vestibulo-ocular reflex movement is calculated. A tendency for the driver 3 to concentrate on the forward narrow range is high in the case where the vehicle 2 runs on the straight road rather than the case where the vehicle 2 runs on a road with continuous curves. The suitability degree evaluator 12d may determine that the steering data is not suitable as the state of calculating the vestibulo-ocular reflex movement in the case where the steering data is larger than the predetermined steering angle.

(5) The suitability degree evaluator 12d may acquire the position data of the vehicle 2 or the running road data through the data acquisition unit 12b in accordance with the acquisition cycle of the captured image taken in the calculator 12c, and determine whether the vehicle 2 runs currently on the straight road. By this determination, whether the data calculated by the calculator 12c is the data suitable for the calculation of the vestibulo-ocular reflex movement, namely, the suitability degree of the situation in calculating the vestibulo-ocular reflex movement (for example, the presence or absence of the suitability, the suitability degree according to the binary determination such as the level of the suitability, or the suitability degree by the multilevel determination such as the rate of suitability) can be evaluated. The position data of the vehicle 2 or the running road data are acquired from the navigation device 50.

A tendency for the driver 3 to concentrate on the forward narrow range is high in the case where the vehicle 2 runs on the straight road rather than the case where the vehicle 2 runs on a road with continuous curves. In the case where the vehicle 2 does not run on the straight road, the suitability degree evaluator 12d may evaluate that the position data of the vehicle 2 or the running road data are not suitable as the state of calculating the vestibulo-ocular reflex movement.

(6) The suitability degree evaluator 12d may acquire the surrounding monitoring data acquired by the vehicle exterior sensor 31 through the data acquisition unit 12b in accordance with the acquisition cycle of the captured image taken in the calculator 12c, and determine whether an obstacle or a preceding vehicle exists around the vehicle 2. By this determination, whether the data calculated by the calculator 12c is the data suitable for the calculation of the vestibulo-ocular reflex movement, namely, the suitability degree of the situation in calculating the vestibulo-ocular reflex movement (for example, the presence or absence of the suitability, the suitability degree according to the binary determination such as the level of the suitability, or the suitability degree by the multilevel determination such as the rate of suitability) can be evaluated.

In the case where the preceding vehicle or the obstacle moving relative to the vehicle 2 exists, the driver 3 has a tendency to visually follow the relatively moving preceding vehicle or obstacle, and the eyes of the driver 3 move actively. The state in which the eyes move actively is not in the state suitable for calculating the vestibulo-ocular reflex movement. For this reason, in the case where the preceding vehicle or the obstacle moving relative to the vehicle 2 is detected, the suitability degree evaluator 12d may evaluate that the case where the preceding vehicle or the obstacle moves relative to the vehicle 2 is not suitable as the state of calculating the vestibulo-ocular reflex movement.

(7) The suitability degree evaluator 12d may acquire the direction of the sight line of the driver 3 from the calculator 12c, and evaluate whether the data calculated by the calculator 12c is the data suitable for the calculation of the vestibulo-ocular reflex movement, namely, the suitability degree of the situation in calculating the vestibulo-ocular reflex movement (for example, the presence or absence of the suitability, the suitability degree according to the binary determination such as the level of the suitability, or the suitability degree by the multilevel determination such as the rate of suitability) based on the direction of the sight line of the driver 3. A known sight line detection method is adopted as a method for evaluating the direction of the sight line of the driver 3 from the image in which the face of the driver 3 is captured.

For example, in the case where the driver 3 looks at a distant forward place such as a direction of the horizon, there is a high possibility that the driver 3 concentrates on looking at the front. For example, in the case where the direction of the sight line falls within a predetermined angle (for example, ±5 degrees in the vertical direction or ±5 degrees in the right-left direction) with respect to the front direction (reference direction) of the vehicle, the case where the driver 3 looks at the distant forward place may be evaluated to be suitable as the state in which the driver 3 concentrates on the front, namely, the state of calculating the vestibulo-ocular reflex movement.

In the case where the driver 3 looks at the operation unit or the display in the vehicle such as the navigation device 50, there is a high possibility that the driver 3 gazes at the narrow range carefully. Thus, for example, the case where the direction of the sight line of the driver 3 is the installation direction of the navigation device 50 or the like may be evaluated to be suitable as the state of calculating the vestibulo-ocular reflex movement. However, the case where the vestibulo-ocular reflex movement is calculated from the calculated data in gazing at the equipment in the vehicle carefully is preferably applied to the automatic driving vehicle having the automatic driving level of an SAE level 3 or more from the viewpoint of safety.

(8) The suitability degree evaluator 12d may evaluate the suitability degree of the situation in calculating the vestibulo-ocular reflex movement by determining whether the data is suitable for calculating the vestibulo-ocular reflex movement based on the momentum (parallel movement or rotational movement) of the head movement calculated by the calculator 12c. The vestibulo-ocular reflex movement is the eye movement that is not generated unless the head of the driver 3 moves. Thus, the suitability degree evaluator 12d may evaluate that the case where the momentum (parallel movement or rotational movement) of the head movement calculated by the calculator 12c is smaller than predetermined momentum is not suitable as the state of calculating the vestibulo-ocular reflex movement.

(9) The suitability degree evaluator 12d may acquire the acceleration data of the vehicle 2 through the data acquisition unit 12b in accordance with the acquisition cycle of the captured image taken in the calculator 12c, and evaluate the suitability degree of the situation in calculating the vestibulo-ocular reflex movement (for example, the presence or absence of the suitability, the suitability degree according to the binary determination such as the level of the suitability, or the suitability degree by the multilevel determination such as the rate of suitability) by determining whether the data calculated by the calculator 12c is the data suitable for calculating the vestibulo-ocular reflex movement based on the acceleration data of the vehicle 2. In the case where predetermined acceleration is generated in the up-down, right-left, or front-rear direction of the vehicle 2, the head of the driver 3 moves easily in the up-down, right-left, or pitch direction.

Thus, in the case where the acceleration data of the vehicle 2 is larger than a threshold at which the head movement of the driver 3 is easily generated, the suitability degree evaluator 12d may evaluate that the acceleration data of the vehicle 2 is suitable as the state of calculating the vestibulo-ocular reflex movement. The suitability degree evaluator 12d may evaluate that the case where the vibration of the vehicle 2 and the head movement, which are obtained from the acceleration data of the vehicle 2, have a certain relationship such as the vibration at an identical frequency in the identical direction is suitable as the state of calculating the vestibulo-ocular reflex movement. In addition to the use of the data from the acceleration sensor 32 mounted on the vehicle 2, the acceleration data of the vehicle 2 may be obtained from the speed of the vehicle 2 that is obtained from a time-series change of the distance to the object recognized by the vehicle exterior sensor 31.

As described above, in the case where the suitability degree evaluator 12d determines that the data is suitable or highly suitable as the state of calculating the vestibulo-ocular reflex movement, the suitability degree evaluator 12d outputs the determination data indicating that the data is suitable or highly suitable to the provision unit 12e as the suitability degree. On the other hand, in the case where the suitability degree evaluator 12d determines that the data is not suitable or the suitability is low as the state of calculating the vestibulo-ocular reflex movement, the suitability degree evaluator 12d outputs the determination data indicating that the data is not suitable or the suitability is low to the provision unit 12e as the suitability degree. Alternatively, in the case where the suitability degree evaluator 12d evaluates the suitability degree indicating the extent of suitability as the state of calculating the vestibulo-ocular reflex movement, the suitability degree evaluator 12d outputs the data indicating the extent of suitability to the provision unit 12e as the suitability degree.

The suitability degree evaluator 12d may be configured to perform the evaluation of any one of the above (1) to (9), or may be configured to appropriately combine and perform the evaluations of at least two of the above (1) to (9) according to the state of the vehicle 2 or the driver 3. The processing timing is controlled in the calculator 12c and the suitability degree evaluator 12d such that the suitability degree can be obtained in each image frame used in the calculation of the calculator 12c. For example, the suitability degree is evaluated in each image frame in accordance with a taken-in cycle of the captured image in the calculator 12c.

In the case where the calculated data calculated by the calculator 12c and the suitability degree evaluated by the suitability degree evaluator 12d are acquired, the provision unit 12e performs processing of providing the suitability degree evaluated by the suitability degree evaluator 12d to the data (the calculated data of each image frame) relating to the pupil movement and the head movement of the driver 3 that are calculated by the calculator 12c.

The provision unit 12e outputs the data relating to the pupil movement and the head movement of the driver 3 and the suitability degree provided to the data to the reflex movement calculator 12f while linking the data relating to the pupil movement and the head movement of the driver 3 and the suitability degree provided to the data with each other in each image frame.

For example, the suitability degree may be binary data indicating the presence or absence of the suitability as the state of calculating the VOR or the level of the suitability, or multi-valued data according to the extent of suitability, namely, weighted multi-valued data. In the case where the multi-valued data corresponding to the extent of suitability is used as the suitability degree, the suitability as the state of calculating the VOR can finely be discriminated by weighting.

The reflex movement calculator 12f performs processing of calculating the vestibulo-ocular reflex movement of the driver 3 based on the data relating to the pupil movement and the head movement of the driver 3 and the suitability degree provided to the data, which are acquired from the provision unit 12e.

For example, among the pieces of data acquired from the provision unit 12e, the reflex movement calculator 12f sequentially stores the data in which the suitability degree satisfies a predetermined condition in the calculated data storage 133. Then, in the case where the data in which the suitability degree satisfies the predetermined condition is stored in the calculated data storage 133 for a predetermined time, the reflex movement calculator 12f performs processing of calculating the vestibulo-ocular reflex movement of the driver 3 using the stored data for the predetermined time. The data in which the suitability degree satisfies the predetermined condition is the data in which the suitability degree is highly evaluated. For example, in the case where the binary data indicating the determination result of the presence or absence (or the level) of the suitability is provided as the suitability degree, the data in which the suitability degree satisfies the predetermined condition is the data evaluated to be suitable (or highly suitable). Alternatively, in the case where the multi-valued data indicating the rate of suitability is provided as the suitability degree, the data in which the suitability degree satisfies the predetermined condition is the data in which the suitability degree is higher than a predetermined threshold (or greater than or equal to the predetermined threshold).

The reflex movement calculator 12f sequentially stores the data acquired from the provision unit 12e and the suitability degree in the calculated data storage 133 while linking the data acquired from the provision unit 12e and the suitability degree with each other, and performs the processing of calculating the vestibulo-ocular reflex movement of the driver 3 using the data in which the suitability degree satisfies the predetermined condition among the pieces of data stored for the predetermined time in the case where the pieces of data are stored in the calculated data storage 133 for the predetermined time. For example, in the case where the binary data indicating the determination result of the presence or absence (or the level) of the suitability is provided as the suitability degree to the data in which the suitability degree satisfies the predetermined condition among the pieces of data stored for the predetermined time, the data in which the suitability degree satisfies the predetermined condition is the data evaluated to be suitable (or highly suitable). Alternatively, in the case where the multi-valued data indicating the rate of suitability is provided as the suitability degree, the data in which the suitability degree satisfies the predetermined condition may be the data in which the suitability degree is higher than a predetermined threshold (or greater than or equal to the predetermined threshold) or the data having a predetermined number of frames extracted from the data having the higher suitability degree.

After performing the processing of calculating the vestibulo-ocular reflex movement, the reflex movement calculator 12f outputs the calculated data relating to the vestibulo-ocular reflex movement to the sleepiness detector 12g.

The calculated data relating to the vestibulo-ocular reflex movement calculated by the reflex movement calculator 12f includes at least one of the pieces of data (also referred to as parameters) such as a VOR gain, a residual standard deviation, and a delay time, and the calculated data preferably includes the VOR gain. In principle, the VOR gain means a rate of response of the pupil movement (eye rotation angular velocity) with respect to head movement (head rotation angular velocity), and the VOR gain can be expressed by the pupil movement (eye rotation angular velocity) or the head movement (head rotation angular velocity).

For example, the VOR gain can be obtained by least squares estimation using an equation [Mathematical formula 2] as a coefficient G of a regression model of an equation [Mathematical formula 1], in which an objective variable is an eye rotation angular velocity e(t) and an explanatory variable is an ideal eye angular velocity h(t) and a constant term dc. Where ε(T) is a residual of the regression model, and τ is a delay time of the eye movement with respect to the ideal eye movement. An angle of the eye movement is obtained based on the data of the pupil movement calculated by the calculator 12c, and the eye rotation angular velocity e(t) can be obtained by differentiating the angle of the eye movement. The ideal eye angular velocity h(t) can be obtained by obtaining an angle of the head movement based on the data of the head movement calculated by the calculator 12c, and the ideal eye angular velocity h(t) can be obtained by differentiating the angle of the head movement. The VOR gain may be calculated for at least one of the front-rear, up-down, right-left, yaw, and pitch directions of the driver 3.

$$e(t) = Gh(t - \tau) + dc + \varepsilon(t) \qquad \text{[Mathematical formula 1]}$$

$$G = \frac{N\sum_{t=1}^{N} h(t-\tau)e(t) - \sum_{t=1}^{N} h(t-\tau)\sum_{t=1}^{N} e(t)}{N\sum_{t=1}^{N} h^2(t-\tau) - \left(\sum_{t=1}^{N} h(t-\tau)\right)^2}$$ [Mathematical formula 2]

The residual standard deviation (SDres) can be calculated by the following equation [Mathematical formula 3].

$$SDres = \sqrt{\frac{1}{N-1}\sum_{t=1}^{N} \varepsilon^2(t)}$$ [Mathematical formula 3]

In the VOR gain and the residual standard deviation, data of a first time (for example, tens of seconds or a predetermined number of frames) is set to one segment such that sufficient estimation accuracy is obtained, and a value in each segment may be calculated at every third time shorter than a second time while overlap is provided for the second time shorter than the first time. When the driver 3 feels sleepy, generally, the VOR gain decreases and the residual standard deviation tends to increase. Thus, a rate of change such as the rate of decrease of the VOR gain or a rate of change such as a rate of increase of the residual standard deviation may be obtained in order to accurately determine a sign of the sleepiness.

When acquiring the calculated data relating to the vestibulo-ocular reflex movement is acquired from the reflex movement calculator 12f, the sleepiness detector 12g detects the sleepiness of the driver 3 using the acquired calculated data relating to the vestibulo-ocular reflex movement. For example, using at least one of the VOR gain, the residual standard deviation, and the delay time, a comparison with a predetermined threshold may be made to detect a sleepiness level indicating a degree of sleepiness of the driver 3. Alternatively, the sleepiness level may be detected in consideration of parameters other than the vestibulo-ocular reflex movement, such as a frequency of blinking or an opening and closing degree of the eye. After detecting the sleepiness of the driver 3, the sleepiness detector 12g outputs the detection result of the sleepiness of the driver 3, for example, the sleepiness level to the awakening controller 12h.

The awakening controller 12h performs processing of outputting, to the awakening device 70, a control signal for awakening the driver 3 based on the sleepiness level acquired from the sleepiness detector 12g. When the awakening device 70 is constructed with the alarm device that issues the alarm to the driver 3 by sound or light, the awakening controller 12h outputs, to the alarm device, a control signal for operating the alarm device for a predetermined period. In the case where the awakening device 70 is constructed with the air conditioner that blows cold air, warm air, or gas containing an aroma component or an odor component to the driver 3, the awakening controller 12h outputs, to the air conditioner, a control signal for operating the air conditioner for a predetermined period. In the case where the awakening device 70 is constructed with the vibrating device that vibrates a steering wheel, a seat belt, a seat, or the like, the awakening controller 12h outputs, to the vibration device, a control signal for operating the vibration device for a predetermined period.

Processing of outputting a control signal for awakening the driver 3 may be performed on the navigation device 50. In this case, the control signal includes a control signal causing the navigation device 50 to output alarm sound or alarm display awakening the driver 3.

Processing Operation Example

Figure 4:
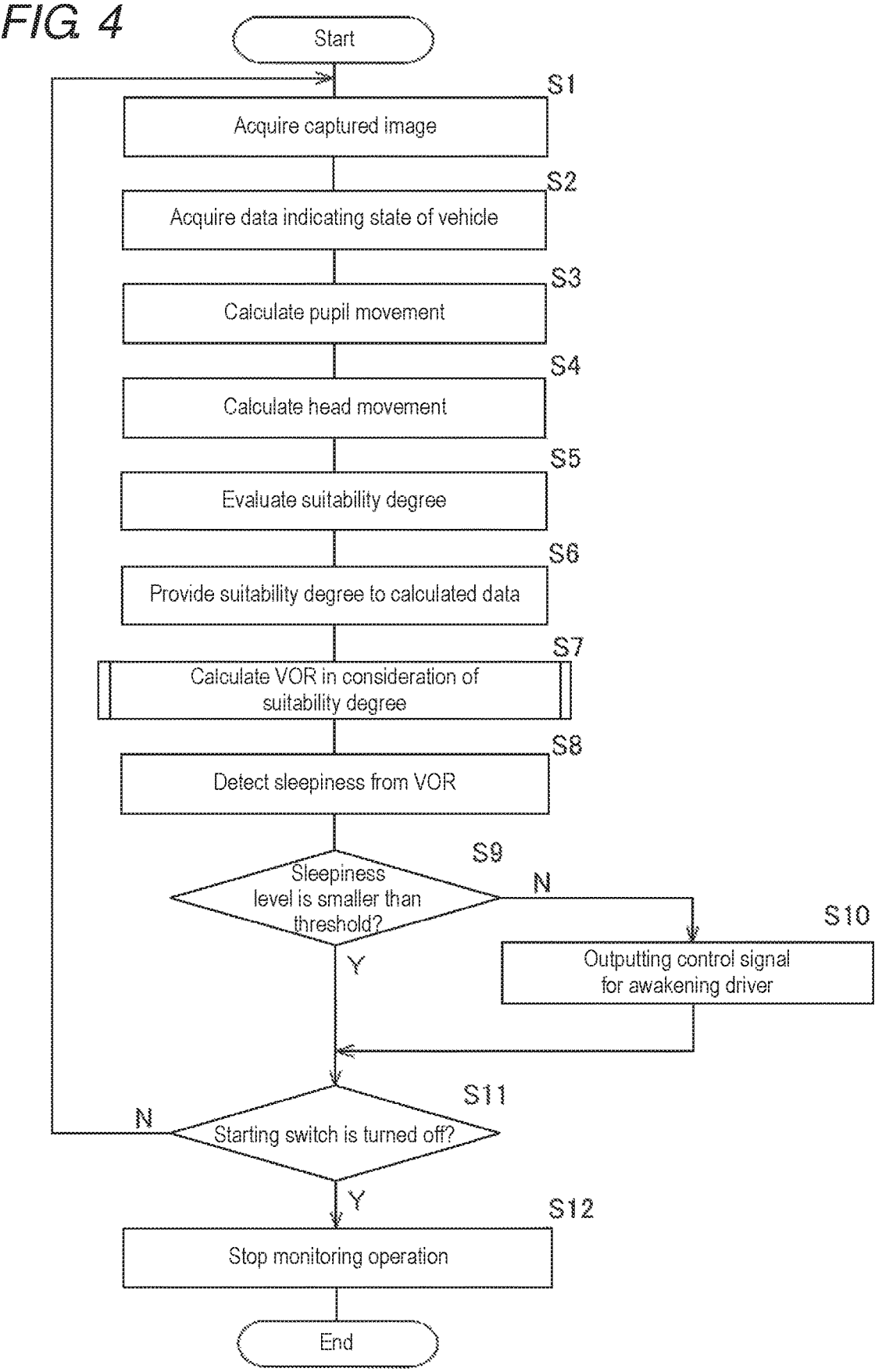
FIG. 4 is a flow diagram illustrating an example of a processing operation performed by a control unit in a data processing device of one or more embodiments.

FIG. 4 is a flowchart illustrating an example of a processing operation performed by the control unit 12 in the data processing device 10 of one or more embodiments. The following processing operation is only by way of example, and a change such as omission, replacement, and addition of the processing step can appropriately be made.

(Activation of Monitoring System 1)

When the starting switch 40 of the vehicle 2 is turned on by the driver 3, the data processing device 10 and the camera 20 constituting the monitoring system 1 are activated, and the control unit 12 of the data processing device 10 starts the processing of monitoring the driver 3 based on the program 134.

In step S1, the control unit 12 operates as the image acquisition unit 12a, and performs the processing of acquiring the captured image from the camera 20 disposed so as to capture the image of the face of the driver 3. In the camera 20, images of a predetermined number of frames are captured every second. The control unit 12 acquires these captured images in time series, and performs processing in each frame or each frames at predetermined intervals. Upon acquiring the captured image, the control unit 12 advances the processing to step S2.

In step S2, the control unit 12 operates as the data acquisition unit 12b, and performs the processing of acquiring the data indicating the state of the vehicle 2 from the in-vehicle sensor 30, the navigation device 50, and the like. For example, the detection data of each sensor may be acquired from the in-vehicle sensor 30, or the road data including the shape (such as the straight line and the curve) of the running road may be acquired from the navigation device 50. Upon acquiring the data indicating the state of the vehicle 2, the control unit 12 advances the processing to step S3.

In step S3, the control unit 12 operates as the calculator 12c, and performs the processing of calculating the pupil movement of the driver 3. The above method is adopted in calculating the pupil movement performed by the calculator 12c. For example, the processing of calculating the pupil movement is performed in each frame of the captured image acquired in step S1. After calculating the pupil movement of the driver 3, the control unit 12 advances the processing to step S4.

In step S4, the control unit 12 operates as the calculator 12c, and performs the processing of calculating the head movement of the driver 3. The above method is adopted in calculating the head movement performed by the calculator 12c. For example, the processing of calculating the head movement is performed in each frame of the captured image acquired in step S1. After calculating the head movement of the driver 3, the control unit 12 advances the processing to step S5. The order of steps S3 and S4 may be changed. The order of step S2 may be changed to be after step S4.

In step S5, the control unit 12 operates as the suitability degree evaluator 12d, and performs the processing of evaluating the suitability degree of the situation in calculating the vestibulo-ocular reflex movement based on the pupil movement and the head movement of the driver 3. In the processing performed by the suitability degree evaluator 12d, the suitability degree may be evaluated by any one of the above methods (1) to (9), or the suitability degree may be evaluated by appropriately combining at least two of the above methods (1) to (9) according to the state of the vehicle 2 or the driver 3. When the suitability degree of the situation in calculating the vestibulo-ocular reflex movement is evaluated, the control unit 12 advances the processing to step S6. In step S5, the extent of suitability (rate of suitability) expressed as the multi-valued data is evaluated as the suitability degree.

In step S6, the control unit 12 operates as the provision unit 12e, and performs the processing of providing the suitability degree evaluated in step S5 to the data relating to the pupil movement and the head movement calculated in steps S3, S4. When the suitability degree is provided to the data relating to the pupil movement and the head movement of each image frame, the control unit 12 advances the processing to step S7.

In step S7, the control unit 12 operates as the reflex movement calculator 12f, and performs the processing of calculating the vestibulo-ocular reflex movement of the driver 3 based on the calculated data in consideration of the suitability degree provided to the data (calculated data) relating to the pupil movement and the head movement in step S6. A specific example of the processing operation in step S7 will be described later. The calculated data (parameters) relating to the vestibulo-ocular reflex movement includes at least one of the VOR gain, the residual standard deviation, and the delay time. After calculating the vestibulo-ocular reflex movement of the driver 3, the control unit 12 advances the processing to step S8.

In step S8, the control unit 12 operates as the sleepiness detector 12g, and performs the processing of detecting the sleepiness of the driver 3, for example, the sleepiness level from the vestibulo-ocular reflex movement of the driver 3 calculated in step S7. As described above, the sleepiness level of the driver 3 may be detected using at least one of the parameters such as the VOR gain, the residual standard deviation, and the delay time, and the sleepiness level of the driver 3 may be detected in consideration of the frequency of blinking or the opening and closing degree of the eye. After performing the processing of detecting the sleepiness level of the driver 3, the control unit 12 advances the processing to step S9.

In step S9, the control unit 12 operates as the awakening controller 12h, and determines whether the sleepiness level detected in step S8 is smaller than a predetermined threshold (a threshold at which the generation of the sleepiness can be determined). When determining that the sleepiness level is greater than or equal to the predetermined threshold (the sleepiness is generated) in step S9, the control unit 12 advances the processing to step S10. On the other hand, when determining that the sleepiness level is lower than the predetermined threshold (the sleepiness is not generated) in step S9, the control unit 12 advances the processing to step S11.

In step S10, the control unit 12 operates as the awakening controller 12h, and performs the processing of outputting, to the awakening device 70, the predetermined control signal for awakening the driver 3. When the awakening control is performed on the driver 3, the control unit 12 advances the processing to step S11.

In step S11, the control unit 12 determines whether the starting switch 40 is turned off. When determining that the starting switch 40 is not turned off, the control unit 12 returns to the processing in step S1. On the other hand, when determining that the starting switch 40 is turned off in step S11, the control unit 12 advances the processing to step S12. In step S12, the control unit 12 stops the monitoring operation, and ends the processing.

Figure 5:
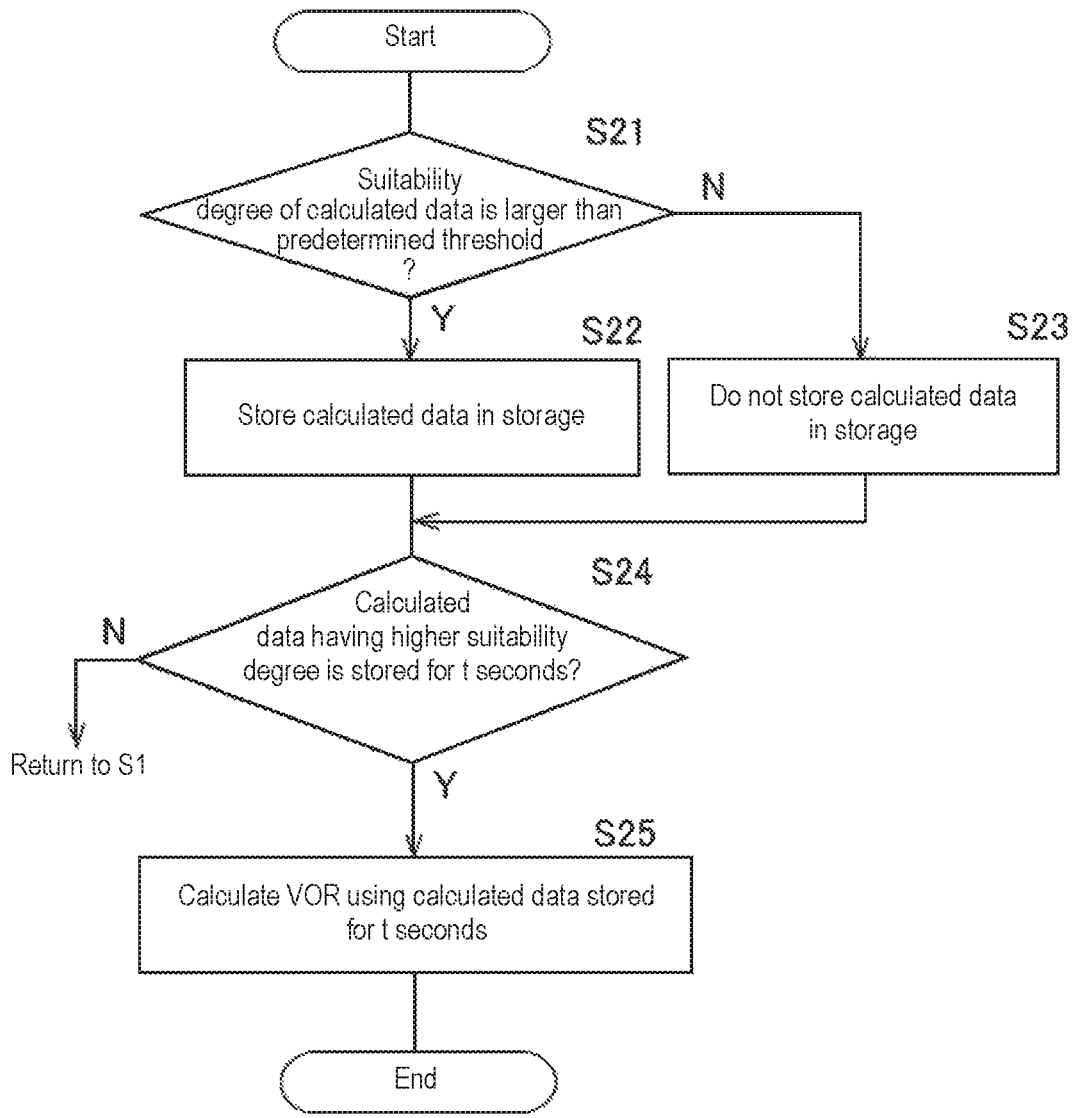
FIG. 5 is a flow diagram illustrating a first example of a VOR calculation processing operation performed by a control unit in a data processing device of one or more embodiments.

FIG. 5 is a flowchart illustrating a first example of the VOR calculation processing operation (the processing operation in step S7 of FIG. 5) performed by the data processing device 10 of one or more embodiments. In step S21, the control unit 12 determines whether the suitability degree provided to the data (calculated data) relating to the pupil movement and the head movement of the driver 3 is larger than a predetermined threshold. The predetermined threshold is a value determining whether the calculated data is suitable for the use of the calculation of the VOR. When the suitability degree is determined to be larger than the predetermined threshold in step S21, the control unit 12 advances the processing to step S22.

In step S22, the control unit 12 performs the processing of storing the calculated data of the image frame to which the suitability degree is provided in the calculated data storage 133, and then advances the processing to step S24.

On the other hand, when determining that the suitability degree is less than or equal to the predetermined threshold in step S21, the control unit 12 advances the processing to step S23. In step S23, the control unit 12 performs the processing of not storing the calculated data of the image frame to which the suitability degree is provided in the calculated data storage 133, and then advances the processing to step S24.

In step S24, the control unit 12 determines whether the calculated data to which the suitability degree higher than the predetermined threshold is provided is stored in the calculated data storage 133 for the predetermined time (for example, for t seconds: t seconds indicate several seconds to several tens of seconds. For example, for 40 seconds). Whether the calculated data corresponding to the predetermined number of image frames is stored may be determined instead of the predetermined time. When determining that the calculated data having the suitability degree higher than the predetermined threshold is not stored in the calculated data storage 133 for t seconds in step S24, the control unit 12 returns to step S1 in FIG. 3 to repeat the processing.

On the other hand, when determining that the calculated data to which the suitability degree higher than the predetermined threshold is provided is stored in the calculated data storage 133 for t seconds in step S24, the control unit 12 advances the processing to step S25. In step S25, the control unit 12 performs the processing of calculating the vestibulo-ocular reflex movement of the driver 3 using the calculated data stored in the calculated data storage 133 for t seconds. Thereafter, the control unit 12 finishes the VOR calculation processing, and advances the processing to step S8 in FIG. 4.

Figure 6:
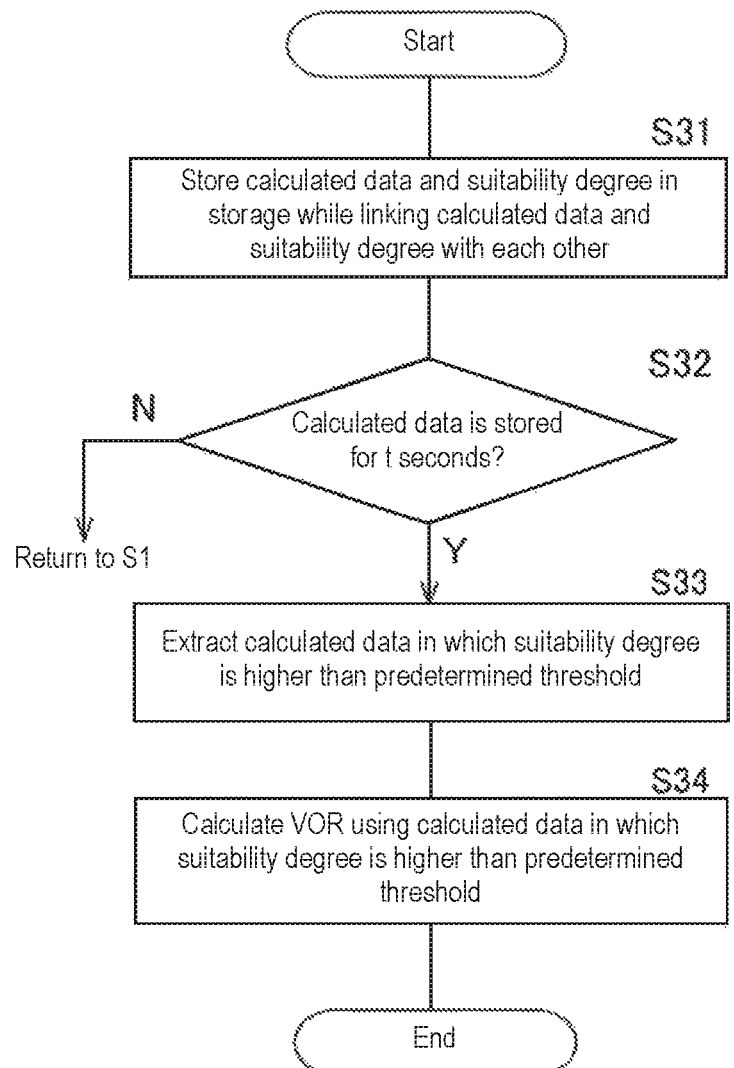
FIG. 6 is a flow diagram illustrating a second example of a VOR calculation processing operation performed by a control unit in a data processing device of one or more embodiments.

FIG. 6 is a flowchart illustrating a second example of the VOR calculation processing operation (the processing operation of step S7 in FIG. 5) performed by the data processing device 10 of one or more embodiments. In step S31, the control unit 12 performs the processing of storing the data (calculated data) relating to the pupil movement and the head movement of the driver 3 and the suitability degree provided to the calculated data in the calculated data storage 133 while linking the data (calculated data) relating to the pupil movement and the head movement of the driver 3 and the suitability degree provided to the calculated data with each other. After performing the storage processing in the calculated data storage 133, the control unit 12 advances the processing to step S32.

In step S32, the control unit 12 determines whether the calculated data is stored in the calculated data storage 133 for the predetermined time (for example, for t seconds: t seconds indicate several seconds to several tens of seconds. For example, for 40 seconds). Whether the calculated data corresponding to the predetermined number of image frames is stored may be determined instead of the predetermined time.

When determining that the calculated data is not stored in the calculated data storage 133 for t seconds in step S32, the control unit 12 returns to step S1 in FIG. 3 to repeat the pieces of processing in steps S1 to S6. On the other hand, when determining that the calculated data is stored in the calculated data storage 133 for t seconds in step S32, the control unit 12 advances the processing to step S33.

In step S33, the control unit 12 performs the processing of extracting the calculated data to which the suitability degree higher than the predetermined threshold is provided among the pieces of calculated data stored in the calculated data storage 133 for t seconds, and then advances the processing to step S34.

The predetermined threshold may be a previously-set threshold value, or may appropriately be changed according to a value, such as an average value, a median value, a mode value, and a standard deviation, which is obtained by statistically processing the suitability degree provided to each calculated data for t seconds. For example, the threshold value may be set higher with increasing average value, median value, or mode value of the suitability degree. For the high average value of the suitability degree, the VOR can accurately be calculated even for the small number of pieces of calculated data, and efficiency of the calculation processing can also be enhanced. For the large standard deviation of the suitability degree, the threshold is raised, and the calculation accuracy of the VOR can be enhanced using the calculated data to which the high suitability degree is provided.

In step S34, the control unit 12 performs the processing of calculating the vestibulo-ocular reflex movement of the driver 3 using the calculated data to which the suitability degree higher than the predetermined threshold is provided, the calculated data being extracted in step S33. Subsequently, the control unit 12 ends the VOR calculation processing, and advances the processing to step S8 in FIG. 3.

FIG. 7 is a flowchart illustrating a third example of the VOR calculation processing operation (the processing operation in step S7 of FIG. 5) performed by the data processing device 10 of one or more embodiments.

In step S41, the control unit 12 performs the processing of storing the data (calculated data) relating to the pupil movement and the head movement of the driver 3 and the suitability degree provided to the calculated data in the calculated data storage 133 while linking the data (calculated data) relating to the pupil movement and the head movement of the driver 3 and the suitability degree provided to the calculated data with each other. After performing the storage processing in the calculated data storage 133, the control unit 12 advances the processing to step S42.

In step S42, the control unit 12 determines whether the calculated data is stored in the calculated data storage 133 for the predetermined time (for example, for t seconds: t seconds indicate several seconds to several tens of seconds. For example, for 40 seconds). Whether the calculated data corresponding to the predetermined number of image frames is stored may be determined instead of the predetermined time.

When determining that the calculated data is not stored in the calculated data storage 133 for t seconds in step S42, the control unit 12 returns to step S1 in FIG. 3 to repeat the processing. On the other hand, when determining that the calculated data is stored in the calculated data storage 133 for t seconds in step S42, the control unit 12 advances the processing to step S43.

In step S43, the control unit 12 performs the processing of extracting the pieces of calculated data for the predetermined number of frames in the descending order of the provided suitability degree among the pieces of calculated data stored in the calculated data storage 133 for t seconds, and then advances the processing to step S44.

The predetermined number of frames may be a previously-set number, or may appropriately be changed according to a value, such as an average value, a median value, a mode value, and a standard deviation, which is obtained by statistically processing the suitability degree provided to each calculated data for t seconds. For example, the number of extracted frames may be set lower with increasing average value, median value, or mode value of the suitability degree. For the high average value of the suitability degree, the VOR can accurately be calculated even for the small number of pieces of calculated data, and the efficiency of the calculation processing can also be enhanced. For the large standard deviation of the suitability degree, the threshold is raised, and the calculation accuracy of the VOR can be enhanced using the calculated data to which the high suitability degree is provided.

In step S44, the control unit 12 performs the processing of calculating the vestibulo-ocular reflex movement of the driver 3 using the pieces of calculated data for the predetermined number of frames from the descending order of the suitability degree, the pieces of calculated data being extracted in step S43. Subsequently, the control unit 12 ends the VOR calculation processing, and advances the processing to step S8 in FIG. 3.

Operation and Effect

In the data processing device 10 of one or more embodiments, the suitability degree evaluator 12d evaluates the suitability degree of the situation in calculating the vestibulo-ocular reflex movement, and the provision unit 12e provides the suitability degree (for example, the binary data indicating the presence or absence of the suitability or the level of the suitability, or the multi-valued data indicating the extent of suitability) to the calculated data. Thus, what kind of the suitability is owned by the calculated data as the state of calculating the vestibulo-ocular reflex movement can be discriminated by the suitability degree provided to the calculated data. In consideration of the suitability degree, the reflex movement calculator 12f calculates the vestibulo-ocular reflex movement of the driver 3 based on the calculated data. Consequently, even in the actual vehicle environment where the complicated eye movement and the like are generated, the calculation accuracy of the vestibulo-ocular reflex movement of the driver 3 can be enhanced using the proper data in which the suitability degree is considered among the pieces of calculated data.

In a first example of the VOR calculation processing performed by the data processing device 10, the data to which the suitability degree higher than the predetermined threshold is provided among the pieces of calculated data is sequentially stored in the calculated data storage 133, so that a storage capacity of the calculated data storage 133 can be reduced as compared with the case where all the pieces of calculated data to which the suitability degree is provided are stored. The vestibulo-ocular reflex movement of the driver 3 is calculated using the calculated data having the high suitability degree for the predetermined time, the calculated data being stored in the calculated data storage 133. For this reason, as compared with the case of calculating the VOR using all the pieces of calculated data to which the suitability degree is provided, a calculation amount can be reduced, the VOR can efficiently be calculated, and a load on the calculation processing of the control unit 12 can be reduced. The vestibulo-ocular reflex movement of the driver 3 can accurately be calculated in the actual vehicle environment using the calculated data to which the suitability degree higher than the predetermined threshold is provided, namely, the calculated data in the state suitable for calculating the VOR.

In the second and third examples of the VOR calculation processing performed by the data processing device 10, the calculated data and the suitability degree are stored in the calculated data storage 133 while linked with each other. Then, among the calculated data of the predetermined time stored in the calculated data storage 133, the vestibulo-ocular reflex movement of the driver 3 is calculated using the calculated data to which the suitability degree higher than the predetermined threshold is provided or the pieces of calculated data for the predetermined number of frames in the descending order of the suitability degree among the pieces of calculated data of the predetermined time, the pieces of calculated data being stored in the calculated data storage 133. For this reason, as compared with the case of calculating the VOR using all the pieces of calculated data to which the suitability degree is provided, the calculation amount can be reduced, the vestibulo-ocular reflex movement of the driver can efficiently be calculated, and the load on the calculation processing of the control unit 12 can be reduced. The vestibulo-ocular reflex movement of the driver 3 can accurately be calculated in the actual vehicle environment using the calculated data to which the suitability degree higher than the predetermined threshold is provided or the pieces of calculated data for the predetermined number of frames in the descending order of the suitability degree, namely, the calculated data in the state suitable for calculating the VOR.

The sleepiness level of the driver 3 can accurately be detected in the actual vehicle environment because the data processing device 10 includes the sleepiness detector 12g, and the control of properly awakening the driver 3 can be performed according to the sleepiness level because the data processing device 10 includes the awakening controller 12h.

In the monitoring system 1 including the data processing device 10 and the camera 20, a driver monitoring system that is easily introduced in an actual vehicle environment can be provided. The awakening system including the data processing device 10 and the awakening device 70 can provide a system capable of properly awakening the driver 3 in the actual vehicle environment.

OTHER EMBODIMENTS

Although one or more embodiments are described in detail above, the above description is merely an example of the present invention in all respects. Various improvements and modifications can be made without departing from the scope of the present invention.

First Modification

The control unit 12 of the data processing device 10 does not need to include all the units in FIG. 3. In one or more embodiments, the control unit 12 may be constructed with a first configuration including at least the calculator 12c, the suitability degree evaluator 12d, the provision unit 12e, and the reflex movement calculator 12f, a second configuration further including the sleepiness detector 12g in addition to the first configuration, or a third configuration further including the awakening controller 12h in addition to the second configuration.

Second Modification

In the first example of the VOR calculation processing operation performed by the control unit 12 in FIG. 5, whether the suitability degree is larger than the predetermined threshold is determined in step S21. The suitability degree is not limited to the multi-valued data indicating the rate of suitability, but may be the binary data indicating the presence or absence of the suitability or the level of the suitability. In the case where the suitability degree is the binary data, the presence or absence of the suitability or the level of the suitability may be determined in step S21.

Third Modification

In one or more embodiments, the monitoring system 1 and the data processing device 10 are mounted on the vehicle 2. However, the monitoring system 1 and the data processing device 10 are not limited to in-vehicle use. In one or more embodiments, for example, the monitoring system 1 and the data processing device 10 can be installed in a factory or in an office, and widely applied to a system that monitors the sleepiness of a person who operates equipment installed in the factory or a person who performs predetermined work at the desk. In this case, for example, a production device is operated by the person in the factory. For example, an office instrument such as a personal computer is operated by the person in the office.

[Supplementary Notes]
One or more embodiments may also be described as follows, but not limited thereto.
(Supplementary Note 1)
A data processing device (10) that performs data processing of monitoring a person, the data processing device (10) including:
a calculator (12c) configured to calculate pupil movement and head movement of the person;
an evaluator (12d) configured to evaluate a suitability degree of a situation in calculating vestibulo-ocular reflex movement based on the pupil movement and the head movement of the person;
a provision unit (12e) configured to provide the suitability degree evaluated by the evaluator (12d) to data relating to the pupil movement and the head movement of the person calculated by the calculator (12c); and
a calculator (12f) configured to calculate the vestibulo-ocular reflex movement of the person based on the data in consideration of the suitability degree.
(Supplementary Note 2)
A monitoring system (1) including:
the data processing device (10); and an imaging device (20) configured to capture an image including the person, wherein the calculator (12c) of the data processing device (10) calculates the pupil movement and the head movement of the person using the image acquired from the imaging device (20).

(Supplementary Note 3)

A data processing method for monitoring a person, the data processing method including:

a calculation step (S3, S4) of calculating pupil movement and head movement of the person;

an evaluation step (S5) of evaluating a suitability degree of a situation in calculating vestibulo-ocular reflex movement based on the pupil movement and the head movement of the person;

a provision step (S6) of providing the suitability degree evaluated in the evaluation step (S5) to data relating to the pupil movement and the head movement of the person calculated in the calculation step (S3, S4); and a calculation step (S7) of calculating the vestibulo-ocular reflex movement of the person based on the data in consideration of the suitability degree.

(Supplementary Note 4)

A data processing program causing at least one computer (12) to perform data processing of monitoring a person, the data processing program causing the at least one computer (12) to perform:

a calculation step (S3, S4) of calculating pupil movement and head movement of the person;

an evaluation step (S5) of evaluating a suitability degree of a situation in calculating vestibulo-ocular reflex movement based on the pupil movement and the head movement of the person;

a provision step (S6) of providing the suitability degree evaluated in the evaluation step (S5) to data relating to the pupil movement and the head movement of the person calculated in the calculation step (S3, S4); and a calculation step (S7) of calculating the vestibulo-ocular reflex movement of the person based on the data in consideration of the suitability degree.

The invention claimed is:

1. A data processing device that performs data processing of monitoring a person, the data processing device comprising a processor configured with a program to perform operations comprising:

operation as a calculator configured to calculate pupil movement and head movement of the person;

operation as an evaluator configured to evaluate a suitability degree of a situation in calculating vestibulo-ocular reflex movement based on the pupil movement and the head movement of the person;

operation as a provision unit configured to provide the suitability degree evaluated by the evaluator to data relating to the pupil movement and the head movement of the person calculated by the calculator; and operation as a reflex movement calculator configured to calculate the vestibulo-ocular reflex movement of the person based on the data in consideration of the suitability degree.

2. The data processing device according to claim 1, wherein the processor is configured with the program to perform operations further comprising: operation as a first storage configured to store data in which the suitability degree satisfies a predetermined condition among pieces of data to which the suitability degree is provided, and the processor is configured with the program to perform operations such that operation as the reflex movement calculator is further configured to calculate the vestibulo-ocular reflex movement of the person using the data stored in the first storage.

3. The data processing device according to claim 2, wherein the processor is configured with the program to perform operations further comprising: operation as a sleepiness detector configured to detect sleepiness based on the vestibulo-ocular reflex movement of the person calculated by the reflex movement calculator.

4. The data processing device according to claim 3, wherein the processor is configured with the program to perform operations further comprising: operation as an awakening controller configured to perform control of awakening the person based on the sleepiness detected by the sleepiness detector.

5. The data processing device according to claim 2, wherein the processor is configured with the program to perform operations such that operation as the evaluator is further configured to evaluate the suitability degree based on a state of the person or an object operated by the person.

6. The data processing device according to claim 5, wherein the object comprises a vehicle, and the person comprises a driver of the vehicle.

7. The data processing device according to claim 6, wherein the processor is configured with the program to perform operations such that operation as the evaluator is further configured to evaluate the suitability degree based on at least one of a noise component included in the data, a sight line direction of the driver, a running state of the vehicle, and a detection state of the object existing in a traveling direction of the vehicle.

8. The data processing device according to claim 6, wherein the processor is configured with the program to perform operations such that operation as an acquisition unit configured to acquire acceleration of the vehicle, and the processor is configured with the program to perform operations such that operation as the evaluator is further configured to evaluate the suitability degree based on a relationship between a change in acceleration of the vehicle acquired from the vehicle and the head movement or the pupil movement of the driver calculated by the calculator.

9. The data processing device according to claim 1, wherein the processor is configured with the program to perform operations further comprising: operation as a second storage configured to store the data and the suitability degree, and the processor is configured with the program to perform operations such that operation as the reflex movement calculator is further configured to calculate the vestibulo-ocular reflex movement of the person using the data in which the suitability degree satisfies a predetermined condition among pieces of data stored in the second storage.

10. The data processing device according to claim 9, wherein the data in which the suitability degree satisfies the predetermined condition is data in which the suitability degree is higher than a predetermined threshold or a predetermined number of pieces of data extracted in descending order of the suitability degree.

11. The data processing device according to claim 1, wherein
the processor is configured with the program to perform operations further comprising: operation as a sleepiness detector configured to detect sleepiness based on the vestibulo-ocular reflex movement of the person calculated by the reflex movement calculator.

12. The data processing device according to claim 11, wherein
the processor is configured with the program to perform operations further comprising: operation as an awakening controller configured to perform control of awakening the person based on the sleepiness detected by the sleepiness detector.

13. An awakening system comprising:
the data processing device according to claim 12; and
an awakening device controlled by the awakening controller of the data processing device.

14. The data processing device according to claim 1, wherein the processor is configured with the program to perform operations such that operation as the evaluator is further configured to evaluate the suitability degree based on a state of the person or an object operated by the person.

15. The data processing device according to claim 14, wherein
the object comprises a vehicle, and
the person comprises a driver of the vehicle.

16. The data processing device according to claim 15, wherein the processor is configured with the program to perform operations such that operation as the evaluator is further configured to evaluate the suitability degree based on at least one of a noise component included in the data, a sight line direction of the driver, a running state of the vehicle, and a detection state of the object existing in a traveling direction of the vehicle.

17. The data processing device according to claim 15, wherein
the processor is configured with the program to perform operations such that operation as an acquisition unit configured to acquire acceleration of the vehicle, and
the processor is configured with the program to perform operations such that operation as the evaluator is further configured to evaluate the suitability degree based on a relationship between a change in acceleration of the vehicle acquired from the vehicle and the head movement or the pupil movement of the driver calculated by the calculator.

18. A monitoring system comprising:
the data processing device according to claim 1; and
an imaging device configured to capture an image including the person, wherein
the processor is configured with the program to perform operations such that operation as the calculator of the data processing device is further configured to calculate the pupil movement and the head movement of the person using the image acquired from the imaging device.

19. A data processing method for monitoring a person, the data processing method comprising:
calculating pupil movement and head movement of the person;
evaluating a suitability degree of a suitability of the calculated pupil movement and calculated head movement in calculating vestibulo-ocular reflex movement based on the pupil movement and the head movement of the person in a given situation;
providing the evaluated suitability degree to data relating to the calculated pupil movement and the calculated head movement of the person; and
calculating the vestibulo-ocular reflex movement of the person based on the data in consideration of the suitability degree.

20. A non-transitory computer-readable storage medium storing a data processing program, which when read and executed, causes at least one computer to perform data processing of monitoring a person, the data processing program, which when read and executed, causes the at least one computer to perform operations comprising:
calculating pupil movement and head movement of the person;
evaluating a suitability degree of a situation in calculating vestibulo-ocular reflex movement based on the pupil movement and the head movement of the person;
providing the evaluated suitability degree to data relating to the calculated pupil movement and the calculated head movement of the person; and
calculating the vestibulo-ocular reflex movement of the person based on the data in consideration of the suitability degree.

* * * * *